United States Patent Office 3,503,959
Patented Mar. 31, 1970

3,503,959
3-AMINO STEROIDS
Robert G. Christiansen, Schodack, and John W. Dean, Sand Lake, N.Y., assignors to Sterling Drug Inc., New York, N.Y., a corporation of Delaware
No Drawing. Continuation-in-part of application Ser. No. 183,737, Mar. 30, 1962. This application Mar. 17, 1964, Ser. No. 352,663
Claims priority, application Great Britain, Mar. 28, 1963, 12,292/63
Int. Cl. C07c 173/10, 169/20
U.S. Cl. 260—239.5
41 Claims This application is a continuation-in-part of our co-pending application Ser. No. 183,737, filed Mar. 30, 1962, now abandoned.

This invention relates to substituted 3-amino steroids and in particular is concerned with 3-amino- and -substituted amino steroids and intermediates in their preparation.

One aspect of the invention is concerned with compounds having the formula

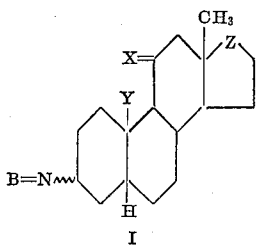

I wherein $B=N$ is lower-alkylamino, cycloalkylamino, lower-allkanoylamino, carbamylamino, N,N-di-lower-alkylcarbamylamino, N-(carbamyl)-lower-alkylamino, 2-lower-alkanoylamino, carbamylamino, N,N-di-lower-alkylamino, piperidino - lower - alkylamino, pyrrolidino-lower - alkylamino, pyridyl-lower - alkylamino, di-lower-alkylamino-lower-alkylamino, tertiary-amino, or tertiary-amino N-oxide, tertiary-amino in each instance being basic and having a molecular weight less than 200; X is $H_2$, (H)(OH), (H)(Oacyl) or O; Y is H or $CH_3$, and Z is $CH_2$,

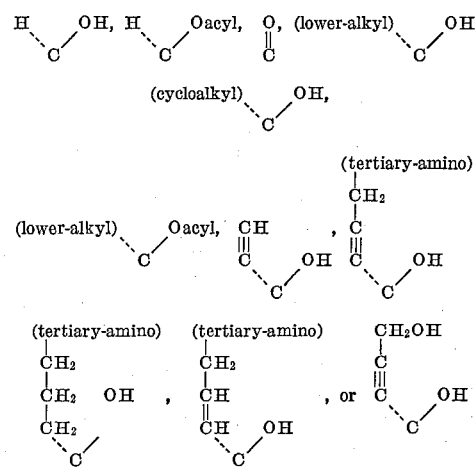

tertiary-amino in each instance being basic and having a molecular weight less than 200, and acyl in each instance having from one to ten carbon atoms and a molecular weight less than 200.

Also included within the scope of the invention are compounds of the above formula having a double bond in one of the 7,8-, 8,9-, 8,14-, 9,11-, 11,12-, 14,15-, and 15,16-positions; a methyl group in one of the 1-, 2-, 4-, 5-, 6-, 7- and 16-positions; or a hydroxy group in one of the 6-, 7- and 12-positions.

The compounds of the above Formula I possess the $5\beta$ (rings A/B cis) configuration and thus belong to the etiocholane series. The wavy line joining $B=N$ to the 3-position in formula I indicates that the substituent may have either the $\alpha$- or $\beta$-configuration. Both configurations are included within the scope of this invention.

In the above Formula I, $B=N$ stands for a substituted amino group. The substituted amino group can be a secondary-amino group of the type RHN- where R is lower-alkyl, cycloalkyl, morpholino - lower-alkyl, piperidino-lower-alkyl, pyrrolidino-lower - alkyl, pyridyl - lower-alkyl, or di-lower-alkylamino-lower-alkyl; or an amido or ureido group such as lower-alkanoylamino, carbamyl-amino, N,N-di-lower alkylcarbamylamino, N-(lower-alkanoyl) lower-alkylamino, N-(carbamyl - lower - alkyl-amino, or 2-lower-alkanoyl-1-hydrazino. In the foregoing groupings the lower-alkyl moieties have from one to about six carbon atoms; the cycloalkyl groups have 5–6 ring members, and the lower-alkanoyl groups have from one to about six carbon atoms.

The substituted amino group can also be a tertiary-amino group. By a tertiary-amino group is meant a group of the type RR'N— wherein R and R' are both organic substituents so that the complete molecule to which it is attached is a tertiary-amine. The tertiary-amino group is preferably basic and has a molecular weight less than about 200. Basic tertiary amino groups are those of the aliphatic or aralipathic type that impart to the molecules which contain them sufficient basicity (ionization to the extent of at least $10^{-6}$) so that the compounds readily form acid-addition salts with strong inorganic and organic acids. A particularly preferred class of tertiary-amino groups are di-lower-alkylamino, for example, di-methylamino, diethylamino, dibutylamino, methylethylamino; and the like; dicycloalkylamino in which the cycloalkyl has from 5 to 6 ring members, for example, dicyclopentylamino, dicyclohexylamino, bis(4 - methylcyclohexyl)amino, and the like; N-(cycloalkyl)-lower - alkylamino in which the cycloalkyl has from 5 to 6 ring members, for example, N-(cyclohexyl)methyl-amino, N-(cyclopentyl)ethylamino, and the like; polymethylenimino having from 5 to 7 ring members, for example, 1-pyrolidyl, 1-piperidyl, 3- or 4-hydroxy-1-piperidyl, hexamethylenimino and lower-alkylated derivatives thereof; 4-morpholinyl, 1 - piperazinyl; 4-hydrocarbon-substituted - 1-piperazinyl in which the hydrocarbon substituent has from 1 to 10 carbon atoms, for example, 4-methyl-1-piperazinyl, 4-phenyl-1-piperazinyl, and the like; 4-carbo-lower-alkoxy-1-piperazinyl; 1-homopiperazinyl and lower-alkylated derivatives thereof, di-(phenyl - lower-alkyl) amino, for example, dibenzylamino, bis(phenylethyl) amino, and the like; N-(phenyl-lower-alkyl)-lower-alkyl-amino, for example, N-(benzyl)methyl - amino, N-(phenylethyl)ethylamino, and the like; and N-lower-alkyl-N-(di-lower-alkylamino-lower-alkyl)amino, for example, N-methyl-N-(2-dimethylaminoethyl)amino, N - ethyl - N-(3-dibutyl-aminopropyl)amino, and the like. In the foregoing groupings, the term lower-alkyl stands for alkyl groups containing from one to about six carbon atoms. Also included within the scope of the expression $B=N$ are N-oxides of the tertiary-amino groups of the type described hereinabove.

In the 17-position of compounds of the above Formula I, as indicated by the symbol Z and its definitions, there can be an oxo group or a $\beta$-hydroxy group, optionally esterified. In addition to the $\beta$-hydroxy group there can also be present an $\alpha$-lower-alkyl, $\alpha$-cycloalkyl (having from 3 to 6 ring members), $\alpha$-ethynyl, $\alpha$-(3-tertiary-amino-1-propynyl), $\alpha$-(3-tertiary - amino - 1 - propenyl), α-(3-tertiary-aminopropyl) or α-(3-hydroxy-1-propynyl) substituent. The α-lower-alkyl substituent has from one to about six carbon atoms.

In compounds containing an esterified 17β-hydroxy group (Z=CHO acyl), the acyl radicals are preferably derived from carboxylic acids or organic sulfonic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; phenyl-lower-alkanoyl or -alkenoyl radicals, such as phenylacetyl, β-phenylpropionyl, cinnamoyl, and the like; phenyloxy-lower-alkanoyl radicals, such as p-chlorophenoxyacetyl; pyridine carbonyl, such as nicotinoyl and isonicotinoyl; and sulfonic acids, such as methanesulfonic acid, benzenesulfonic acid, p-toluenesulfonic acid, 2-naphthalenesulfonic acid, and the like. In those acyl radicals containing phenyl groups, the phenyl groups can be unsubstituted or substituted by one or more inert substituents, for example, lower-alkyl, lower-alkoxy, halogen or nitro. Also contemplated are esters derived from inorganic esters such as the nitrate and phosphate esters.

The compounds of Formula I can be prepared by the processes described hereinbelow:

(a) A compound of the formula

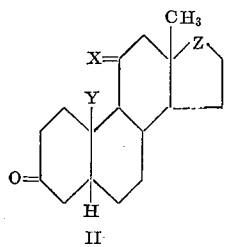

wherein X and Y have the meanings given hereinabove; and Z is a member of the group consisting of

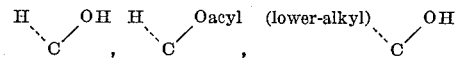

and

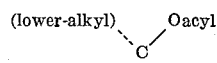

is heated with a formamide derivative of the formula B=N—CO—H wherein B=N is lower-alkylamino, cycloalkylamino or tertiaryamino, preferably in the presence of formic acid. The process is usually carried out by heating the reactants at a temperature between about 100° C. and 200° C. Products having both stereo-chemical configurations at the 3-position, wherein the B=N group has the α- or β-orientation are produced, with the α-form usually predominating.

(b) A compound of the formula

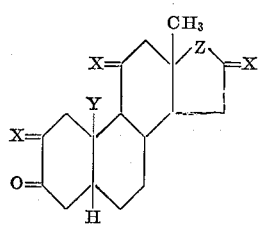

wherein X and Y have the meanings given hereinabove; and Z is a member of the group consisting of

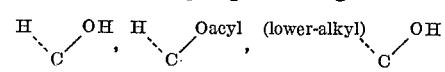

and

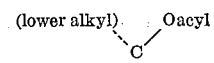

is treated with an amine of the formula B=NH, wherein B=N is a member of the group consisting of lower-alkylamino, cycloalkylamino and di-lower-alkylamino-lower-alkylamino, under catalytic hydrogenation conditions.

(c) A compound of the formula

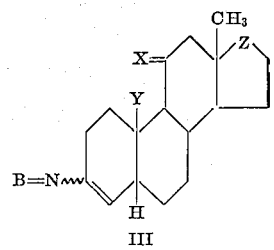

wherein X and Y have the meanings given hereinabove; and Z is a member of the group consisting of

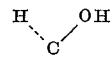

and

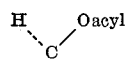

and B=N is a tertiary-amino group, is catalytically hydrogenated. A palladium-on-carbon catalyst is preferably used and the reduction takes place at ordinary temperatures. Again a mixture of isomers at C–3 is produced. The starting material, the steroid enamine of Formula III, is prepared by heating a ketone of Formula II with a secondary-amine B=NH in an inert solvent with means for removing the water produced in the reaction.

(d) A compound of the formula

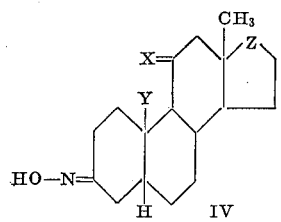

wherein X and Y have the meanings given hereinabove; and Z is a member of the group consisting of

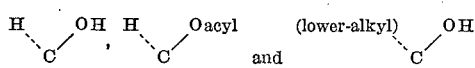

is reduced either catalytically or with an alkali metal-lower-alkanol medium. Catalytic hydrogenation, as with palladium-on-carbon catalyst, gives both a 3α- and a 3β-amino compound, whereas the alkali metal-alcohol reduction, as with sodium in n-butanol, gives predominantly a 3α-amino compound as the product. The 3-amino compounds in turn serve as intermediates for the 3-acylamino compounds of the invention, prepared by conventional N-acylation procedures.

By a modification of this process, compounds of Formula I where B=N is 2-lower-alkanoyl-1-hydrazino can be prepared by catalytic hydrogenation of the 3-loweracylhydrazone analog of the oxime of Formula IV.

(e) A compound of the formula

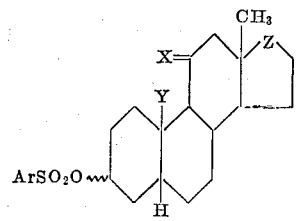

wherein X and Y have the meanings given hereinabove; Z is

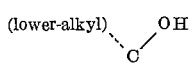

or

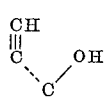

and Ar is an aromatic hydrocarbon radical of 1–2 rings, for example, phenyl, p-tolyl, 1-naphthyl, 2-naphthyl, etc., is heated with a secondary amine B=NH. The process takes place at a temperature between about 100° C. and 200° C., optionally in the presence of an inert solvent. During the reaction a Walden inversion takes place at the 3-position, the product having a configuration opposite to that of the starting arylsulfonate compound.

Auxiliary processes are used to produce other compounds within the scope of Formula I as follows:

Compounds of Formula I wherein Z is C=O are produced by oxidizing the corresponding compounds wherein Z is CH(OH). This oxidation is readily accomplished by the action of chromic oxide in acid medium. The 17-oxo derivatives can be converted to ketone derivatives such as the oxime, hydrazone, semicarbazone and the like, which are also within the purview of the invention. Alternatively, compounds where Z is S=O can be obtained by lead tetraacetate oxidation of the corresponding compounds where Z is C($\alpha$-OH)($\beta$-CHOHCH$_3$).

Oxygen substituents in the 11-position [X is (H)(OH) or O] are sufficiently less reactive than those in the 3-position, so that the latter can be subjected to transformations without affecting the former. Similarly, oxygen substituents at C–17 are more reactive than oxygen substituents at C–11.

Compounds of Formula I wherein Z is C(OH)lower-alkyl, C(OH)cycloalkyl or C(OH)C≡CH are produced by treating a compound wherein Z is C=O with a lower-alkylmagnesium halide, a cycloalkyllithium or an alkali metal acetylide, respectively, and hydrolyzing the organometallic intermediate thus produced. Similarly, compounds of Formula I wherein Z is C(OH)C≡CCH$_2$(tertiary-amino) are produced by reacting a compound wherein Z is C=O with an alkali or alkaline earth metal derivative of a 3-(tertiary-amino)-1-propyne. Compounds of Formula I where Z is C(OH)C≡CCH$_2$OH are similarly prepared by treating a compound where Z is C=O with an alkali or alkaline earth metal derivative of propargyl alcohol.

Compounds of Formula I where Z is

C(OH)CH=CHCH$_2$(tertiary-amino)

or C(OH)CH$_2$CH$_2$CH$_2$(tertiary-amino) are prepared by partial or complete catalytic hydrogenation of compounds where Z is C(OH)C≡CCH$_2$(tertiary-amino).

Compounds of Formula I wherein Z is CH$_2$ are produced by a Wolff-Kishner reduction of the corresponding compounds wherein Z is C=O, that is by alkaline decomposition of the hydrazone, semicarbazone or azine of the latter.

Compounds of Formula I wherein B=N is carbamylamino are prepared by treating the corresponding compounds wherein B=N is H$_2$N with nitrourea. Those wherein B=N is N,N-di-lower-alkylcarbamylamino are prepared by treating the corresponding compounds wherein B=N is H$_2$N with a N,N-di-lower-alkylcarbamyl chloride.

Compounds of Formula I wherein the B=N moiety has at least one hydrogen attached to the nitrogen atom can be methylated by causing them to react with formaldehyde and formic acid.

Compounds of Formula I wherein B=N is a tertiary-amino N-oxide radical are produced by treating the corresponding compounds wherein B=N is a tertiary-amino radical with a peroxide compound such as hydrogen peroxide, or an organic peracid, such as peracetic acid.

Compounds of Formula I wherein B=N is lower-alkanoyl-amino and/or Z is CH(Oacyl) or C(lower-alkyl)(Oacyl) are produced by conventional acylation or esterification reactions as by treating the corresponding compounds wherein B=N is H$_2$N- and/or Z is CH(OH) or C(lower-alkyl)(OH) with the appropriate acid halide or acid anhydride. The N-lower-alkanoyl radicals can be reduced to N-lower-alkyl radicals by reduction with metal hydrides.

Compounds of Formula I having a double bond in one of the 7,8-, 8,9-, 9,11-, 11,12- and 15,16-positions; a methyl group in one of the 1-, 2-, 4-, 5-, 6-, 7- and 16-positions; or a hydroxy group in one of the 6-, 7- and 12-positions can be prepared by one or more of the foregoing procedures using appropriate starting materials. Compounds having a double bond in the 8,14- or 14,15-position can be prepared by isomerization of the corresponding 7,8-unsaturated compounds.

Alternatively, compounds of Formula I having a double bond in the 9,11-, 11,12- or 6,7-position are prepared by elimination of a sulfonate ester of the appropriate 11-hydroxy, 12-hydroxy or 7-hydroxy compound, respectively. The $\Delta^{15,16}$ compounds are produced by dehydrohalogenation of the corresponding 16-halo derivative, in turn prepared by halogenation of a compound of Formula I wherein Z is C=O.

Another aspect of the invention comprises 3-tertiary-amino-16-arylmethylene-steroids of the formula

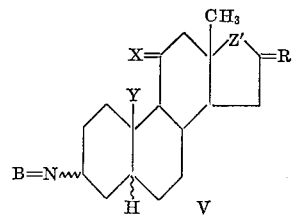

wherein B=N is tertiary-amino or tertiary-amino N-oxide; R is lower-alkylidene and monocyclic arylmethylene; X is H$_2$, (H)(OH), (H)(Oacyl) or O; Y is H or CH$_3$; and Z' is C=O,

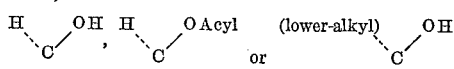

The tertiary-amino radicals are of the same type as described above in connection with the compounds of Formula I. When R is lower-alkylidene, it has from one to six carbon atoms. When R is monocyclic arylmethylene, the monocyclic aryl radicals include radicals of the benzene, pyridine, thiophenyl and furan series and include phenyl, 2-pyridyl, 3-pyridyl, 4-pyridyl, 2-thienyl, 3-thienyl, 2-furyl and 3-furyl, and such radicals substituted by groups inert under the conditions that the compounds are prepared. A preferred group of monocyclic aryl radicals comprises phenyl, 2-pyridyl, 3-pyridyl, 4-pyridyl, 2-thienyl, 3-thienyl, 2-furyl and 3-furyl and such radicals substituted by from one to three substituents selected from the group consisting of halo (including fluoro, chloro, bromo and iodo), nitro, lower-alkyl, lower-alkoxy, methylenedioxy, lower-alkylthio, and di-lower-alkylamino. The lower-alkyl moieties in these substituents can contain from one to about six carbon atoms.

In the compounds of Formula V the tertiary-amino radical, B=N, at C–3 can be either the $\alpha$- or the $\beta$-configuration, and the A/B ring juncture can have either the 5$\alpha$ (trans)(androstane) configuration or the 5$\beta$ (cis) (etiocholane) configuration.

The compounds of Formula V where Z' is C=O are prepared by treating a compound having the formula

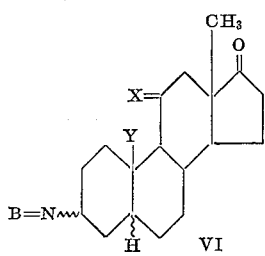

wherein X and Y have the meanings given hereinabove, and B=N is tertiary-amino, with a carbonyl compound O=R, in the presence of a strong base. The reaction is carried out at a temperature between about 50° C. and 150° C. in an organic solvent, for example, a lower-alkanol. The strong base is preferably an alkali metal hydroxide or lower-alkoxide.

The compounds of Formula V wherein Z' is CH(OH) are prepared by alkali metal borohydride reduction of the compounds where Z' is C=O; and the compounds of Formula V wherein B=N is tetiary-amino N-oxide are prepared by hydrogen peroxide oxidation of the compounds wherein B=N is tertiary-amino.

The novel compounds of the instant invention are the compounds of Formulas I and V and the acid-addition and quaternary ammonium salt forms thereof. The compounds of Formulas I and V, in free base form, are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily inter-convertible.

It will thus be appreciated that the Formulas I and V not only represent the structural configuration of the bases of Formulas I and V but are also representative of the respective structural entity which is common to all of the respective compounds of Formulas I and V, whether in the form of the free bases or in the form of the acid-addition salts of the bases. By virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, it is preferred of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, the salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of the new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 3-amino steroids and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid as exemplified by organic mono- and polycarboxylic acids, such as found, for example, in Beilstein's Organische Chemie, 4th ed., volumes III, IV, IX, X, XIV, XVII, XIX, XXI, XXII, and XXV; organic mono- and polysulfonic and -sulfinic acids, such as found, for example, in Beilstein volumes VI, XI, XVI, and XXII; organic phosphonic and phosphinic acids, such as found, for example, in Beilstein volumes XI and XVI; organic acids of arsenic and antimony, such as found, for example, in Beilstein volume XVI; organic heterocyclic carboxylic, sulfonic and sulfinic acids, such as found, for example, in Beilstein volumes XVIII, XXII, and XXV; acidic ion-exchange resins; and inorganic acids of any acid forming element or combination of elements, such as found in Mellor, Comprehensive Treatise on Inorganic and Theoretical Chemistry, Lonman's, Green and Co., New York, N.Y., volumes I–XVI. In addition, other salt-forming compounds which are acidic in their chemical properties, but which are not generally considered as acids in the same sense as carboxylic or sulfonic acids, are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example, boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, Amberlite® XE-66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts of the compounds of Formulas I and V are obtained by the addition of esters of strong acids to the free base form of the compounds, said esters having a molecular weight less than about 300. A preferred class of esters comprises lower-alkyl, lower-alkenyl, and phenyl-lower-alkyl esters of strong inorganic acids or organic sulfonic acids, wherein lower-alkyl and lower-alkenyl have 1–7 carbon atoms, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, for example p-chlorobenzyl chloride, 3,4-dichlorobenzyl chloride, 2,3,4,5,6-pentachlorobenzyl chloride, 4-nitrobenzyl chloride, 4-methoxybenzyl chloride, and the like. In the phenyl-lower-alkyl esters, the phenyl group can be unsubstituted or substituted by one or more substituents inert under the reaction conditions employed, including lower-alkyl, lower-alkoxy, halogen and nitro.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

As in the case of the acid-addition salts, water-insolubility, high toxicity, or lack of crystalline character may make some quaternary ammonium salt species unsuitable or less desirable for use as such in a given pharmaceutical application, the water-insoluble or toxic salts can be converted to the corresponding pharmaceutically-acceptable salts by double decomposition reactions involving the anion, for example, by ion-exchange procedures. Alternatively, if the anion of the original quaternary salts forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid are formed.

Biological evaluation of compounds of Formulas I and V has demonstrated that they possess coronary dilator and antihypertensive activity, and the ability to lower blood cholesterol levels and alter the serum α- and β-lipoprotein ratios, thus indicating their usefulness in regulating the conditions of the cardiovascular system. Compounds of Formula V have also been found to possess antibacterial activity.

The structures of the compounds of the invention were established by the methods of preparation, by the fact that the results of chemical analysis were in agreement with the expected structure, and by their infrared and ultraviolet spectra. The configurations of the groups at the 3-position were established by the principles of conformational analysis and by the behavior of the compounds upon column chromatography and thin-layer chromatography when compared with known 3-amino steroids.

The following examples will further illustrate the invention without the latter being limited thereby.

EXAMPLE 1

(a) 3β-dimethylaminoandrostan-17β-ol. — A solution of 50 g. of androstan-17β-ol-3-one in 44 g. of dimethylformamide and 28 g. of formic acid was heated at reflux for seventeen hours. The solution was cooled to about 50° C. and stirred vigorously while 100 ml. of 6 N hydrochloric acid was added, followed by 100 ml. of water. The crude product was collected by filtration, the filter cake was mixed with some water and the mixture was made alkaline by the addition of saturated potassium carbonate solution. The alkaline mixture was heated on a steam bath and sufficient ethanol was added to bring it into solution. After filtration, the solution was diluted with cold water to a volume of approximately 3 liters, at which point crystallization of the product commenced. In this way a first crop of crystalline material, 35.8 g., M.P. 165–175° C. was obtained. Concentration of the filtrate under reduced pressure afforded a second crop of crystals, 14.6 g., M.P. 141–155° C. Repeated recrystallization from ethyl acetate gave 3β-dimethylaminoandrostan-17β-ol in the form of colorless plates, M.P. 179.2–180.6° C. (corr.), $[\alpha]_D^{25} = +9.6°$ (1% in chloroform).

(b) 3α-dimethylaminoandrostan-17β-ol was obtained by chromatography on silica of the recrystallization liquors from the preparation of the 3β-dimethylaminoandrostan-17β-ol described above. The chromatograph column was eluted with acetone and recrystallized from aqueous methanol to give 3α-dimethylaminoandrostan-17β-ol in the form of colorless needles, M.P. 173.2–174.8° C. (corr.), $[\alpha]_D^{25} = +19.6°$ (1% in chloroform).

EXAMPLE 2

3α-dimethylaminoetiocholan-17β-ol [I; B=N is α-(CH$_3$)$_2$N, Y is CH$_3$, X is H$_2$, Z is CH(OH-β)].—A mixture of 20 g. of etiocholan-17β-ol-3-one, 14 g. of formic acid and 22 g. of dimethylformamide was refluxed for twenty-one hours. To the reaction mixture there was added 50 ml. of 6 N hydrochloric acid followed by 100 ml. of water, and the mixture was then stirred while 35% sodium hydroxide solution (45 ml.) was added slowly. The product was collected by filtration and recrystallized from acetone containing a small amount of methylene dichloride. The resulting 9.5 g. of product was recrystallized again from acetone and dried in vacuo at 78° C. to give 3α-dimethylaminoetiocholan-17β-ol, colorless rods, M.P. 182.6–186.0° C. (corr.), $[\alpha]_D^{25} = +21.8°$ (1% in chloroform); infrared absorption at 2.90, 3.18, 3.41, 3.49, 3.60, 6.80 and 6.91μ.

3α-dimethylaminoetiocholan-17β-ol was found to lower serum cholesterol significantly when administered to rats at a dose level of 100 mg./kg./day. It produced a marked fall in blood lipids when given in oral doses of 10 mg./kg./day to rats fed a high butter fat diet, and a drop in total lipids in cockerels following a single 100 mg./kg. intramuscular injection. There was no evidence of endocrinological activity in the compound.

By replacing the dimethylformamide in the foregoing preparation by a molar equivalent amount of N-cyclohexylformamide there can be prepared 3α-cyclohexylaminoetiocholan-17β-ol [I; B=N is α-C$_6$H$_{11}$NH, Y is CH$_3$, X is H$_2$, Z is CH(OH-β)].

3α-dimethylaminoetiocholan-17β-ol was esterified with propionic anhydride in pyridine solution to give 17β-propionoxy-3α-dimethylaminoetiocholane, colorless prisms, M.P. 89.0°–90.0° C. (corr.) when recrystallized from acetonitrile, $[\alpha]_D^{25} = +21.8°$ (1% in chloroform).

3α-dimethylaminoetiocholan-17β-ol was esterified with nicotinoyl chloride in pyridine solution to give 17β-nicotinoyloxy-3α-dimethylaminoetiocholane, M.P. 134.8–136.8° C. (corr.).

3α-dimethylaminoetiocholan-17β-ol was esterified with acetyl nitrate (from nitric acid and acetic anhydride). The product was recrystallized from acetonitrile to give 3α-dimethylamino-5β-androstan-17β-ol nitrate, tan prisms, M.P. 79.6–80.0° C. (corr.), $[\alpha]_D^{25} = +44.1°$ (1% in chloroform).

3α-dimethylaminoetiocholan-17β-ol can be caused to react in the presence of pyridine with propionic anhydride, caproyl chloride, succinic anhydride, β-cyclohexylpropionic anhydride, benzoyl chloride, phenylacetyl chloride, cinnamoyl chloride, or p-chlorophenoxyacetyl chloride to give, respectively 17β-propionoxy-3α-dimethylaminoetiocholane [I; B=N is α-$(CH_3)_2$N, Y is $CH_3$, X is $H_2$, Z is CH(OCOCH$_2$CH$_3$-β)], 17β-caproyloxy-3α-dimethylaminoetiocholane [I; B=N is α-$(CH_3)_2$N, Y is $CH_3$, X is $H_2$, Z is CH(OCOCH$_2$CH$_2$CH$_2$CH$_2$CH$_3$-β)], 17β-(β-carboxypropionoxy) - 3α - dimethylaminoetiocholane [I; B=N, is α-$(CH_3)_2$N, Y is $CH_3$, X is $H_2$, Z is CH(OCOCH$_2$CH$_2$COOH-β)], 17β-(β-cyclohexylpropionoxy)-3α-dimethylaminoetiocholane [I; B=N is α-$(CH_3)_2$N, Y is $CH_3$, X is $H_2$, Z is CH(OCOCH$_2$CH$_2$C$_6$H$_{11}$-β)], 17β-benzoyloxy-3α-dimethylaminoetiocholane [I; B=N is α-$(CH_3)_2$N, Y is $CH_3$, X is $H_2$, Z is CH(OCOC$_6$H$_5$-β)], 17β - phenylacetoxy - 3α - dimethylaminoetiocholane [I; B=N is α-$(CH_3)_2$N, Y is $CH_3$, X is $H_2$, Z is

CH(OCOCH$_2$C$_6$H$_5$-β)]

17β - cinnamoyloxy - 3α - dimethylaminoetiocholane [I; B=N is α-$(CH_3)_2$N, Y is $CH_3$, X is $H_2$, Z is

CH(OCOCH=CH$_2$C$_6$H$_5$-β)]

or 17β-(p-chlorophenoxyacetoxy) - 3α - dimethylaminoetiocholane [I; B=N is α-$(CH_3)_2$N, Y is $CH_3$, X is $H_2$, Z is CH(OCOCH$_2$OC$_6$H$_4$Cl-β)].

3α-dimethylaminoetiocholan-17β-ol can be caused to react with hydrofluoric acid, hydrochloric acid, hydrobromic acid, hydriodic acid, sulfuric acid, phosphoric acid, tartaric acid, quinic acid, or naphthalene-2-sulfonic acid to give, respectively, the hydrofluoride, hydrochloride, hydrobromide, hydriodide, sulfate (or bisulfate), phosphate (or acid phosphate), tartrate (or bitartrate), quinate, or naphthalene-2-sulfonate salts of 3α-dimethylaminoetiocholan-17β-ol. The hydrofluoride salt can be converted to the hydrochloride salt by treating the former with an ion-exchange resin saturated with chloride ion.

3α-dimethylaminoetiocholan-17β-ol can be caused to react with methyl bromide, methyl iodide, ethyl bromide, n-hexyl chloride, allyl bromide, methyl sulfate, benzyl bromide, or o-chlorobenzyl chloride to give, respectively, the methobromide, methiodide, ethobromide, n-hexochloride, allobromide, methosulfate, benzobromide, or o-chlorobenzochloride salts of 3α-dimethylaminoetiocholan-17β-ol. The methobromide salt had a M.P. above 300° C., $[\alpha]_D^{25} = +27.4°$ (1% in ethanol).

EXAMPLE 3

3α-diethylaminoetiocholan-17β-ol [I; B=N is α-$(C_2H_5)_2$N, Y is $CH_3$, X is $H_2$, Z is CH(OH-β)] was prepared from etiocholan-17β-ol-3-one, formic acid and diethylformamide according to the manipulative procedure described above in Example 2. The product was recrystallized from an acetone-hexane mixture to give 3α-diethylaminoetiocholan-17β-ol in the form of colorless needles, M.P. 153.6–155.6° C. (corr.), $[\alpha]_D^{25} = +25.6°$ (1% in chloroform); infrared absorption at 3.15, 3.44, 3.50, 3.56 and 6.90μ.

EXAMPLE 4

3α-formamidoetiocholan-17β-ol [I; B=N is

α-HCONH

Y is $CH_3$, X is $H_2$, Z is CH(OH-β)]. A mixture of 8.15 g. of etiocholan-17β-ol-3-one, 20 ml. formamide and 20 ml. of 98–100% formic acid was refluxed for twenty-four hours while adding additional formic acid from time to time to maintain a homogeneous mixture. The reaction mixture was allowed to stand at room temperature for forty-eight hours and then added to 800 ml. of water. The supernatant liquid was decanted and the residual gum was dissolved in methanol, the solution filtered, and aqueous sodium bicarbonate solution added until the solution became cloudy. The solution was boiled for one-half hour, and the product was collected by filtration and recrystallized from methanol and from ethanol to give 3α-formamidoetiocholan-17β-ol, M.P. 265.2–271.0° C. (corr.), $[\alpha]_D^{25} = +55.4°$ (1% in ethanol); infrared absorption at 3.08, 3.28, 3.44, 6.00 and 6.40μ.

EXAMPLE 5

3α-methylaminoetiocholan-17β-ol [I; B=N is

α-$CH_3$NH

Y is $CH_3$, X is $H_2$, Z is CH(OH-β)].—To a solution of 6.0 g. of 3α-formamidoetiocholan-17β-ol (Example 4) in 1250 ml. of tetrahydrofuran was added 3.8 g. of lithium aluminum hydride, and the mixture was stirred and refluxed for 30.5 hours. After allowing the mixture to stand at room temperature for thirty-six hours, 6 ml. of water was added, followed by 100 ml. of saturated sodium potassium tartrate solution. The latter mixture was stirred for one hour, and the tetrahydrofuran solution was decanted, dried over anhydrous sodium sulfate and concentrated on a steam bath. The residue was recrystallized from ethyl acetate to give 4.31 g. of product, M.P. 193–198.5° C. (uncorr.). The latter product was triturated with hot benzene, the mixture filtered, and the filtrate concentrated whereupon there separated 3α-methylaminoetiocholan-17β-ol in the form of colorless needles, M.P. 208.0–209.4° C. (corr.), $[\alpha]_D^{25} = +22.1°$.

EXAMPLE 6

(a) Pyrrolidine enamine of etiocholan-17β-ol-3-one.—A mixture of 17.4 g. of etiocholan-17β-ol-3-one, 10 ml. of pyrrolidine and 300 ml. of benzene was refluxed under a water separator for one hour. The mixture was concentrated to dryness in vacuo and the residue recrystallized from acetone to give 11.67 g. of pyrrolidine enamine of etiocholan-17β-ol-3-one, M.P. 145–162° C. (uncorr.).

(b) 3β-(1-pyrrolidyl)etiocholan-17β-ol [I; B=N is β-(1-pyrrolidyl), Y is $CH_3$, X is $H_2$, Z is CH(OH-β)].— The 11.67 g. of pyrrolidine enamine obtained above in part (a) was dissolved in 200 ml. of ethyl acetate and 100 ml. of tetrahydrofuran and hydrogenated in a Parr apparatus in the presence of 2.0 g. of 10% palladium-on-carbon catalyst. After 1 mole of hydrogen had been absorbed, the reaction mixture was filtered and concentrated in vacuo. The residue was triturated with acetone and the product collected by filtration, giving 7.3 g. of M.P. 177–200° C. (uncorr.). The latter was fractionally crystallized from acetone to give 3β-(1-pyrrolidyl)etiocholan-17β-ol in the form of colorless prisms, M.P. 190.8–196.0° C. (corr.), $[\alpha]_D^{25} = +19.7°$.

(c) 3α-(1-pyrrolidyl)etiocholan-17β-ol [I B=N is α-(1-pyrrolidyl), Y is $CH_3$, X is $H_2$, Z is CH(OH-β)].— The total crude pyrrolidine enamine prepared from 20.9 g. etiocholan-17β-ol-3-one as described above in part (a) was dissolved in 300 ml. of tetrahydrofuran and hydrogenated by the method described in part (b) using 5.0 g. of palladium-on-carbon catalyst. The total product was recrystallized from methanol and seeded with the isomer obtained in part (b) above, thus causing the separation of that isomer, M.P. 191–196° C. (uncorr.). The mother liquors were concentrated to dryness and the residue recrystallized from ethyl acetate to give the higher melting isomer, 3α-1(-pyrrolidyl)etiocholan-17β-ol in the form of colorless needles, M.P. 231.0–0.233.2° C. (dec.) (corr.), $[\alpha]_D^{25} = +26.1°$ (1% in chloroform).

By replacing pyrrolidine in part (a) above by a molar equivalent amount of piperidine, morpholine, dibutylamine, dicyclohexylamine, N-(cyclopentyl)methylamine, hexamethylenimine, piperazine, N-methylpiperazine, dibenzylamine, or N-(benzyl)methylamine, and hydrogenating the resulting enamine as described in part (b) above, there can be obtained, respectively, 3-(1-piperidyl)etiocholan-17β-ol [I; B=N is 1-piperidyl, Y is $CH_3$, X is $H_2$, Z is CH(OH-β)], 3-(4-morpholinyl)etiocholan-17β-ol [I; B=N is 4-morpholinyl, Y is $CH_3$, X is $H_2$, Z is CH(OH-β)], 3-dibutylaminoetiocholan-17β-ol [I; B=N is $(C_4H_9)_2N$, Y is $CH_3$, X is $H_2$, Z is CH(OH-β)], 3 - dicyclohexylaminoetiocholan - 17β - ol [I; B=N is $(C_6H_{11})_2N$, Y is $CH_3$, X is $H_2$, Z is CH(OH-β)], 3-[N-(cyclopentyl)methylamino]etiocholan-17β-ol [I; B=N is $(C_5H_9)(CH_3)N$, Y is $CH_3$, X is $H_2$, Z is CH(OH-β)], 3 - hexamethyleniminoetiocholan - 17β - ol [I; B=N is $(CH_2)_6N$, Y is $CH_3$, X is $H_2$, Z is CH(OH-β)], 3-(1-piperazinyl)etiocholan-17β-ol [I; B=N is $HN(CH_2)_4N$, Y is $CH_3$, X is $H_2$, Z is CH(OH-β)], 3-(4-methyl-1-piperazinyl)etiocholan-17β-ol [I; B=N is $$CH_3N(CH_2)_4N$$

Y is $CH_3$, X is $H_2$, Z is CH(OH-β)], 3-dibenzylaminoetiocholan-17β-ol [I; B=N is $(C_6H_5CH_2)_2N$, Y is $CH_3$, X is $H_2$, Z is CH(OH-β)], or 3-[N-(benzyl)methylamino]etiocholan-17β-ol [I; B=N is $$(C_6H_5CH_2)(CH_3)N$$

Y is $CH_3$, X is $H_2$, Z is CH(OH-β)].

By replacing the etiocholan-17β-ol-3-one in part (a) above by a molar equivalent amount of 17β-acetoxyetiocholan - 3 - one or 17α-methyletiocholan-17β-ol-3-one and carrying through the manipulative procedure described in parts (a) and (b) above, there can be obtained, respectively, 17β-acetoxy-3 - (1 - pyrrolidyl) - etiocholane [I; B=N is 1-pyrrolidyl, Y is $CH_3$, X is $H_2$, Z is CH(OCOCH₃ - β)] or 17α - methyl - 3 - (1 - pyrollidyl) etiocholan-17β-ol [I; B=N is 1-pyrrolidyl, Y is $CH_3$, X is $H_2$, Z is C($CH_3$-α)(OH-B)].

EXAMPLE 7

(a) 3α-isopropylidenaminoetiocholan-17β-ol [I; B=N is α-$(CH_3)_2$C=N, Y is $CH_3$, X is $H_2$, Z is CH(OH-B)]. A solution of 6.11 g. of etiocholan-17β-ol-3-one oxime (M.P. 213–217.5° C.) in 400 ml. of n-butanol was heated to reflux, and 15 g. of sodium was added in small portions over a period of three hours. After the sodium had dissolved the solution was cooled to room temperature, washed with aqueous sodium chloride solution, dried over anhydrous sodium sulfate, filtered and concentrated in vacuo. The residue was stirred with 100 ml. of absolute ethanol containing 50 ml. of 2 N hydrochloric acid. The mixture was filtered, diluted with 1.5 liters of water, and dilute sodium hydroxide was added until the mixture had pH 9–10. The resulting precipitate was collected, dried and recrystallized from acetone to give 3α-isopropylidenaminoetiocholan - 17β - ol in the form of colorless needles, M.P. 215.6–220.4° C. (corr.),

$[α]_D^{25}=+35.1$ (1% in chloroform).

(b) 3α-aminoetiocholan-17β-ol [I; B=N is α-$H_2N$, Y is $CH_3$, X is $H_2$, Z is CH(OH-B)].—The preparation described above in part (a) was repeated except that the product was recrystallized from ethyl acetate instead of from acetone, thus preventing the introduction of the isopropylidene group. The 3α-aminoetiocholan-17β-ol thus obtained had the M.P. 176.2–178.8° C. (corr.),

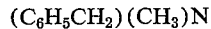
$[α]_D^{25}=+21.6°$ (1% in chloroform); infrared absorption at 3.18, 3.46, 3.52, 6.26 and 6.92 μ.

3α-aminoetiocholan-17β-ol was found to cause a lowering of blood pressure when administered orally to renal hypertensive rats at a dose level of 100 mg./kg.

By replacing the etiocholan-17β-ol-3-one oxime in the foregoing preparation by a molar equivalent amount of 17β-acetoxyetiocholan-3-one oxime or 17α-methyletiocholan-17β-ol-3-one oxime, there can be obtained, respectively, 17β-acetoxy-3α-aminoetiocholan [I; B=N is α-$H_2N$, Y is $CH_3$, X is $H_2$, Z is CH(OCOCH₃-β)] or 17α-methyl-3α-aminoetiocholan-17β - ol [I; B=N is α-$H_2N$, Y is $CH_3$, X is $H_2$, Z is C($CH_3$-α)(OH-β)].

EXAMPLE 8

3β-aminoetiocholan-17β-ol [I; B=N is β-$H_2N$, Y is $CH_3$, X is $H_2$, Z is CH(OH-β)].—A solution of 15.25 g. of etiocholan-17β-ol-3-one oxime in glacial acetic acid was hydrogenated in a Parr apparatus in the presence of 1.5 g. of platinum oxide catalyst. The hydrogenation was complete in two hours, and the mixture was filtered and concentrated in vacuo. The residue, a mixture of the 3α- and 3β-amino isomers, was boiled for a few minutes with an acetone-methylene dichloride mixture to convert the compounds to their N-isopropylidene derivatives. Upon concentration of the solution there separated 2.50 g. of the latter isopropylidene derivative of the 3α-isomer, M.P. 220–226° C., which was removed by filtration. The filtrate was treated with 200 ml. of 10% hydrochloric acid and steam distilled to remove acetone. A solid separated from the distilland which was separated and recrystallized from ethanol containing about 20% of methanol to give 3β-aminoetiocholan-17β-ol in the form of its hydrochloride salt, M.P. above 300° C. (corr.), $[α]_D^{25}=+15.0°$ (1% in ethanol).

3β-aminoetiocholan-17β-ol was found to cause a lowering of blood pressure when administered orally to renal hypertensive rats at a dose level of 15 mg./kg.

EXAMPLE 9

3β - dimethylaminoetiocholan - 17β - ol [I; B=N is β-$(CH_3)_2N$, Y is $CH_3$, X is $H_2$, Z is CH(OH-β)].—Etiocholan-17β-ol-3-one oxime (15.25% g.) was hydrogenated as described above in Example 8, and the total crude mixture of isomers was mixed with 100 ml. of 98% formic acid and 100 ml. of 38–40% formaldehyde and heated at 100° C. for eighteen hours. The reaction mixture was then added to water, made basic, and the solid product was collected by filtration, washed and dried. The solid product was dissolved in ether containing small amounts of acetone and methylene dichloride, and the solution was chromatographed on a column of 500 g. of alumina prepared in 50% ether-pentane. The product was eluted with 100° ether, and the 5.93 g. thus obtained was recrystallized from an acetone-hexane mixture to give 3β-dimethylaminoetiocholan-17β-ol in the form of colorless prisms, M.P. 141.4–142.8° C. (corr.), $[α]_D^{25}=+17.0°$ (1% in chloroform).

The 17-acetate of 3β-dimethylaminoetiocholan-17β-ol, prepared from the 17-hydroxy compound and acetic anhydride in pyridine, had the M.P. 131.8–132.4° C. (corr.) when recrystallized from n-hexane; $[α]_D^{25}=+13.3°$ (1% in chloroform). It had a coronary dilator activity three times that of papaverine.

The 17-benzoate of 3β-dimethylaminoetiocholan-17β-ol, prepared from the 17-hydroxy compound and benzoyl chloride in pyridine, had the M.P. 120.0–124.2° C. (corr.) when recrystallized from acetonitrile; $[α]_D^{25}=+57.7°$ (1% in chloroform).

EXAMPLE 10

(a) 3β-dimethylaminoandrostan-17-one.—To a stirred solution of 3β-dimethylaminoandrostan-17β-ol (Example 1) in 350 ml. of glacial acetic acid was added a solution of 14.3 g. of chromium trioxide in 50 ml. of glacial acetic acid and 25 ml. of water. The solution of oxidizing agent was added in small portions over a period of five minutes while a cold water bath was employed to prevent the temperature of the mixing from rising above 25° C. The reaction mixture was stirred at room temperature for two hours. Methanol (50 ml.) was added to destroy excess oxidizing agent, the mixture was diluted with 3.5 liters of water, and the product was extracted with six 500 ml. portions of methylene dichloride. The methylene dichloride solution was dried for sixty hours over 250 g. of solid potassium carbonate, filtered, and chromatographed on a column of 750 g. of alumina. The column was eluted with 50% ether in n-pentane, followed by ether alone to give 15 g. of 3β - dimethylaminoandrostan - 17 - one, colorless prisms, M.P. 117.0–117.4° C. (corr.) when recrystallized from n-hexane; $[\alpha]_D^{25} = +84.4°$ (1% in chloroform).

3β-dimethylaminoandrostan-17-one was found to have a coronary dilator activity 627 that of papaverine when tested on the rabbit heart at a dose level of 0.1 mg. per heart.

(b) 3β - dimethylaminoandrostan - 17 - one methobromide.—A solution of 3β-dimethylaminoandrostan-17-one (1.2 g.) in 40 ml. of dry acetonitrile was cooled in ice while methyl bromide gas was bubbled through for ten minutes at a rapid rate. The product separated as a white, finely divided solid which was collected by filtration and washed with cold acetonitrile. There was thus obtained 0.89 g. of 3β-dimethylaminoandrostan-17-one, M.P. 315° C. (dec.) (uncorr.), $[\alpha]_D^{25} = +66.4°$ (1% in chloroform).

3β-dimethylaminoandrostan-17-one methobromide was found to cause a lowering of blood pressure when administered subcutaneously to renal hypertensive rats at a dose level of 15 mg./kg.

By replacing the 3β - dimethylaminoandrostan - 17β - ol in part (a) of the preceding preparation by a molar equivalent amount of 3α-diethylaminoetiocholan-17β-ol (Example 3), 3-(1-pyrrolidyl)etiocholan-17β-ol (Example 6), 3β-dimethylaminoetiocholan-17β-ol (Example 9), 3-(1-piperidyl)etiocholan-17β-ol, 3-(4-morpholinyl)etiocholan-17β-ol, 3-dibutylaminoetiocholan-17β-ol, 3-dicyclohexylaminoetiocholan - 17β - ol, 3 - [N-(cyclopentyl)methylamino]etiocholan-17β-ol, 3-hexamethyleniminoetiocholan-17β-ol, 3-(1-piperazinyl)etiocholan-17β-ol, 3-(4-methyl-1-piperazinyl)etiocholan-17β-ol, 3-dibenzylaminoetiocholan-17β-ol, or 3-[N-(benzyl)methylamino]etiocholan-17β-ol, there can be obtained, respectively, 3-diethylaminoetiocholan-17-one [I; B=N is α-(C$_2$H$_5$)$_2$N, Y is CH$_3$, X is H$_2$, Z is C=O], 3-(1-pyrrolidyl)etiocholan-17-one [I; B=N is 1-pyrrolidyl, Y is CH$_3$, X is H$_2$, Z is C=O], 3β-dimethylaminoetiocholan-17-one [I; B=N is β-(CH$_3$)$_2$N, Y is CH$_3$, X is H$_2$, Z is C=O], 3-(1-piperidyl)etiocholan-17-one [I; B=N is 1-piperidyl, Y is CH$_3$, X is H$_2$, Z is C=O], 3-(4-morpholinyl)etiocholan-17-one [I; B=N is 4-morpholinyl, Y is CH$_3$, X is H$_2$, Z is C=O], 3-dibutylaminoetiocholan-17-one [I; B=N is (C$_4$H$_9$)$_2$N, Y is CH$_3$, X is H$_2$, Z is C=O], 3-dicyclohexylaminoetiocholan-17-one [I; B=N is (C$_6$H$_{11}$)$_2$N, Y is CH$_3$, X is H$_2$, Z is C=O], 3-[N - (cyclopentyl)methylamino]etiocholan - 17 - one [I; B=N is (C$_5$H$_9$)(CH$_3$)N, Y is CH$_3$, X is H$_2$, Z is C=O], 3 - hexamethyleniminoetiocholan - 17 - one [I; B=N is (CH$_2$)$_6$N, Y is CH$_3$, X is H$_2$, Z is C=O], 3-(1-piperazinyl(etiocholan-17-one [I; B=N is HN(CH$_2$)$_4$N, Y is CH$_3$ X is H$_2$, Z is C=O], 3-(4-methyl-1-piperazinyl)etiocholan-17-one [I; B=N is CH$_3$N(CH$_2$)$_4$N, Y is CH$_3$, X is H$_2$, Z is C=O], 3-dibenzylaminoetiocholan-17-one [I; B=N is (C$_6$H$_5$CH$_2$)$_2$N, Y is CH$_3$, X is H$_2$, Z is C=O], or 3-[N-(benzyl)methylamino]etiocholan - 17 - one [I; B=N is (C$_6$H$_5$CH$_2$)(CH$_3$)N, Y is CH$_3$, X is H$_2$, Z is C=O].

EXAMPLE 11

3β - dimethylaminoandrostan - 17 - one carboxymethoxime.—A mixture of 3.17 g. of 3β-dimethylaminoandrostan-17-one (Example 10), 1.15 g. of carboxymethoxyamine hemihydrochloride, 1.5 g. of sodium acetate trihydrate, 30 ml. of 95% ethanol and 3 ml. of water was refluxed for three hours. After standing at room temperature for about fifteen hours, the mixture was concentrated to a volume of 10 ml. and poured into 500 ml. of cold water. The solid product which separated was collected by filtration, washed with water and recrystallized by dissolving it in absolute ethanol containing some methylene dichloride and adding water to the hot solution. The product was collected and dried to give 3.46 g. of 3β-dimethylaminoandrostan-17-one carboxymethoxime, M.P. 237.2–239.2° C. (dec.) (corr.), $[\alpha]_D^{25} = +42.0°$; infrared absorption at 2.92, 3.43, 3.53, 3.80 4.07, 6.15–6.23, 6.79 and 6.90μ.

3β-dimethylaminoandrostan-17-one carboxymethoxime was found to cause a lowering of blood pressure when administered orally to renal hypertensive rats at a dose level of 100 mg./kg.

EXAMPLE 12

3α - dimethylaminoetiocholan - 17 - one [I; B=N is α-(CH$_3$)$_2$N, Y is CH$_3$, X is H$_2$, Z is C=O] was prepared by oxidation of 3α-dimethylaminoetiocholan-17β-ol (Example 2) with chromic oxide in acetic acid according to the procedure described above in Example 10. The product was recrystallized from n-pentane to give 3α-dimethylaminoetiocholan-17-one, M.P. 84.6–86.4° C. (corr.), $[\alpha]_D^{25} = +99.1°$ (1% in chloroform).

3α-dimethylaminoetiocholan-17-one was found to lower serum cholesterol significantly when administered to rats at a dose level of 100 mg./kg.

3α-dimethylaminoetiocholan-17-one (9.54 g.) in 50 ml. of ether was added over a period of ten minutes to 50 ml. of a solution of cyclopropyllithium in ether (prepared from 0.9 g. lithium and 7.25 g. of bromocyclopropane) in a nitrogen atmosphere. After forty-eight hours at reflux and sixteen hours at room temperature, the product was isolated and recrystallized from acetonitrile to give 17α-cyclopropyl-3α-dimethylaminoetiocholan-17β-ol, M.P. 168.8–170.0° C. (corr.), $[\alpha]_D^{25} = +3.6°$ (1% in chloroform). The presence of a cyclopropyl group was proved by infrared and NMR spectra.

EXAMPLE 13

3α-dimethylaminoetiocholan-17-one N-oxide [I; B=N is α-(CH$_3$)$_2$NO, Y is CH$_3$, X is H$_2$, Z is C=O].—Hydrogen peroxide (0.82 ml. of 30%) was added dropwise to a solution of 3.18 g. of 3α-dimethylaminoetiocholan-17-one in 10 ml. of absolute ethanol and the mixture was allowed to stand at room temperature for two days. There was then added about 0.5 g. of 10% palladium-on-carbon, and the mixture was swirled and allowed to stand until the evolution of gas ceased. The mixture was concentrated in vacuo and the residue recrystallized from an acetone-hexane mixture to give 3α-dimethylaminoetiocholan-17-one N-oxide, M.P. 152.8–153.6° C. (corr.), $[\alpha]_D^{25} = +97.9°$ (1% in chloroform).

EXAMPLE 14

3α-dimethylamino - 17α - methyletiocholan - 17β - ol [I; B=N is α-(CH$_3$)$_2$N, Y is CH$_3$, X is H$_2$, Z is C(CH$_3$-α)(OH-β)].—Methylmagnesium bromide in ether (70 ml. of 3 M) was added to 100 g. of dry benzene. The solution was stirred and heated until the ether had distilled out, and 6.35 g. of 3α-dimethylaminoetiocholan-17-one (Example 12) in 75 ml. of benzene was added portionwise over a period of twenty minutes. The reaction mixture was stirred and refluxed for hour hours, treated with saturated aqueous ammonium chloride, extracted with water and with saturated sodium chloride solution and dried over anhydrous sodium sulfate. The solution was concentrated in vacuo and the residue recrystallized from an ether-n-pentane mixture to give 3.75 g. of 3α-dimethylamino-17α-methyletiocholan-17β-ol in the form of colorless needles, M.P. 134.8–136.0° C. (corr.), $[\alpha]_D^{25} = +3.4°$ (1% in chloroform). In other runs a higher melting form, M.P. 152–154° C. (corr.) was also obtained.

The methylmagnesium bromide could be replaced with methyllithium and the product obtained in about 80% yield.

3α-dimethylamino-17α - methyletiocholan - 17β - ol was found to lower serum cholesterol significantly when administered to rats at dose levels of 30–50 mg./kg.; and a single intramuscular injection of 100 mg./kg. into cockerels reduced the total lipids and cholesterol 40% and 30%, respectively. There was no evidence of endocrinological activity in the compound.

3α-dimethylamino-17α-methyletiocholan-17β-ol (13.3 g.) refluxed eighteen hours with 25 ml. of acetic anhydride and 75 ml. of pyridine gave 17β-acetoxy-3α-dimethylamino-17α-methyletiocholane, M.P. 79.8–83.8° C. when recrystallized from acetonitrile; $[\alpha]_D^{25}=+13.2°$ (1% in chloroform). It had a coronary dilator activity six times that of papaverine.

By the procedure of Example 13, 17β-acetoxy-3α-dimethylamino-17α-methyletiocholane was caused to react with hydrogen peroxide to give 17β-acetoxy-3α-dimethylamino - 17α - methyletiocholane N - oxide, M.P. 163.0–164.0° C. (corr.) when recrystallized from acetone; $[\alpha]_D^{25}=+12.7°$ (1% in chloroform).

EXAMPLE 15

3β - dimethylamino - 17α - ethynylandrostan-17β-ol.— Potassium (1.00 g.) was added to 50 ml. of liquid ammonia, and acetylene gas was bubbled through until the solution was colorless. After ten minutes of stirring, 15 ml. of pyridine was added dropwise followed by a solution of 3.00 g. of 3β-dimethylaminoandrostan-17-one (Example 10) in 10 ml. of pyridine. The reaction mixture was stirred for two hours under a Dry Ice condenser and the ammonia was then allowed to evaporate. To the residual material was added 800 ml. of water, and the solid material was collected by filtration, washed with water and partitioned between 500 ml. of methylene dichloride and 500 ml. of water. The methylene dichloride layer was dried over magnesium sulfate, concentrated by distillation, and the residue recrystallized twice from methanol to give 3β-dimethylamino-17α-ethynylandrostan-17β-ol in the form of colorless rods, M.P. 237.2–242.6° C. (corr.), $[\alpha]_D^{25}=-33.2°$ (1% in chloroform).

3β-dimethylamino-17α - ethynylandrostan - 17β - ol was found to possess estrogenic activity when administered sub-cutaneously to rats at a dose level of 10 mg./kg.

EXAMPLE 16

By a procedure analogous to that of Example 15, but using lithium instead of potassium, 3α-dimethylaminoetiocholan-17-one (Example 12) was converted to 3α-dimethylamino-17α-ethynyletiocholan-17β-ol [I; B=N is α-(CH$_3$)$_2$N, Y is CH$_3$, X is H$_2$, Z is C(C≡CH-α)(OH-β)], M.P. 146.4–147.4° C. (corr.) (recrystallized from acetonitrile), $[\alpha]_D^{25}=-25.7°$ (1% in chloroform).

EXAMPLE 17

3α - isopropylaminoetiocholan - 17β - ol [I; B=N is α-(CH$_3$)$_2$CHNH, Y is CH$_3$, X is H$_2$, Z is CH(OH-β)] was prepared by hydrogenation of 3α-isopropylidenaminoetiocholan-17β-ol (Example 7(a)) in the presence of palladium-on-carbon catalyst, and was obtained in the form of colorless rods, M.P. 178.6–181.0° C. (corr.) when recrystallized from ethyl acetate; $[\alpha]_D^{25}=+24.5°$ (1% in chloroform).

EXAMPLE 18

3α-formamido-17α-methyletiocholan-17β-ol [I; B=N is α-HCONH, Y is CH$_3$, X is H$_2$, Z is C(CH$_3$-α)(OH-β)] was prepared by heating 3α-amino-17α-methyletiocholan-17β-ol with preformed formic-acetic anhydride (prepared from a mixture of acetic anhydride and formic acid) for two hours at 50–60° C., and was obtained in the form of colorless needles, M.P. 250.4–252.2° C. (corr.) when recrystallized from a methanol-methyl ethyl ketone mixture.

The starting 3α-amino-17α-methyletiocholan-17β-ol was prepared by catalytic hydrogenation of the oxime of 17α-methyletiocholan-17β-ol-3-one according to the procedure described in Example 8.

EXAMPLE 19

3α-methylamino-17α-methyletiocholan-17β-ol [I; B=N is α-CH$_2$NH, Y is CH$_3$, X is H$_2$, Z is C(CH$_3$-α)(OH-β)] was prepared by lithium hydride reduction of 3α-formamido-17α-methyletiocholan-17β-ol (Example 18) according to the procedure described in Example 5, and was obtained in the form of colorless rods, M.P. 128.0–129.4° C. (corr.) when recrystallized from ethyl acetate.

EXAMPLE 20

3α-dimethylaminoetiocholan-17β-ol N-oxide [I; B=N is α-(CH$_3$)$_2$NO, Y is CH$_3$, X is H$_2$, Z is CH(OH-β)] was prepared by hydrogen peroxide oxidation of 3α-dimethylaminoetiocholan-17β-ol (Example 3) according to the procedure described in Example 13, and had the M.P. 187.2–187.8° C. (corr.) when recrystallized from acetone containing a trace of methanol; $[\alpha]_D^{25}=+19.5°$ (1% in chloroform).

EXAMPLE 21

3α-acetamidoetiocholan-17β-ol [I; B=N is

α-CH$_3$CONH

Y is CH$_3$, X is H$_2$, Z is CH(OH)-β)] was prepared by heating 3α-aminoetiocholan-17β-ol (Example 7) with acetic anhydride, and had the M.P. 270.2–271.8° C. (corr.) when recrystallized from aqueous ethanol; $[\alpha]_D^{25}=+49.0°$ (1% in chloroform).

EXAMPLE 22

3α-ethylaminoetiocholan-17β-ol [I; B=N is

α-CH$_3$CH$_2$NH

Y is CH$_3$, X is H$_2$, Z is CH(OH-β)] was prepared from 3.8 g. of 3α-acetamidoetiocholan-17β-ol and 4.2 g. of lithium aluminum hydride in 500 ml. of tetrahydrofuran, refluxed eighteen hours, and was obtained in the form of a colorless solid, M.P. 161.8–162.4° C. (corr.) when recrystallized from acetonitrile; $[\alpha]_D^{25}=+23.1°$ (1% in chloroform).

EXAMPLE 23

3α-dimethylamino-17α-methyletiocholan-17β-ol N-oxide [I; B=N is α-(CH$_3$)$_2$NO, Y is CH$_3$, X is H$_2$, Z is C(CH$_3$-α)(OH-β)] was prepared by hydrogen peroxide oxidation of 3α-dimethylamino-17α-methyletiocholan-17β-ol (Example 14) according to the procedure described in Example 13, and had the M.P. 190.0–190.8° C. (corr.) when recrystallized from acetonitrile; $[\alpha]_D^{25}=+7.7°$ (1% in chloroform). 3α-dimethylamino-17α-methyletiocholan-17β-ol N-oxide was found to be active as a hypocholesteremic agent.

EXAMPLE 24

17β-acetoxy-3α-dimethylaminoetiocholane [I; B=N is α-(CH$_3$)$_2$N, Y is CH$_3$, X is H$_2$, Z is CH(OCOCH$_3$-β)] was prepared from 3α-dimethylaminoetiocholan-17β-ol (Example 9) and acetic anhydride in pyridine solution, and had the M.P. 97.0–98.2° C. (corr.) when recrystallized from acetonitrile.

EXAMPLE 25

3α-dimethylaminoetiocholan-17-one carboxymethoxime [I; B=N is α-(CH$_3$)$_2$N, Y is CH$_3$, X is H$_2$, Z is C=NOCH$_2$COOH] was prepared from 3α-dimethylaminoeticholan-17-one (Example 12) and carboxymethoxyamine according to the procedure of Example 11, and was obtained in the form of colorless plates, M.P. 226.4–227.2° C. (corr.), when recrystallized from ethanol containing a trace of water; $[\alpha]_D^{25}=+86.6°$ (1% in chloroform).

EXAMPLE 26

3α-dimethylaminoetiocholan-17-one oxime [I; B=N is α-(CH$_3$)$_2$N, Y is CH$_3$, X is H$_2$, Z is C=NOH] was prepared from 3α-dimethylaminoetiocholan-17-one (Example 12) and hydroxylamine, and was obtained in the form of colorless needles, M.P. 199.2–203.0° C. (corr.) when recrystallized from ethyl acetate; $[\alpha]_D^{25} = +36.3°$ (1% in chloroform).

EXAMPLE 27

17β-(p - toluenesulfonyloxy) - 3α - dimethylaminoetiocholane [I; B=N is α-(CH$_3$)$_2$N, Y is CH$_3$, X is H$_2$, Z is CH(OSO$_2$C$_6$H$_4$CH$_3$-β)] was prepared by treating 3α-dimethylaminoetiocholan-17β-ol (Example 2) with p-toluenesulfonyl chloride in pyridine at 5° C., and had the M.P. 101.6–102.8° C. (corr.) when recrystallized from acetonitrile; $[\alpha]_D^{25} = +8.8°$ (1% in chloroform).

EXAMPLE 28

Etiocholan-17β-ol-3-one was converted to its enamine with N-methylpiperazine and the enamine hydrogenated according to the procedure of Example 6. The resulting product was chromatographed on alumina to give 3β-(4-methyl-1-piperazinyl)etiocholan-17β-ol [I; B=N is β-(4-methyl-1-piperazinyl), Y is CH$_2$, X is H$_2$, Z is CH(OH-β)], M.P. 202.6–204.0° C. (corr.), when recrystallized from ethyl acetate, $[\alpha]_D^{25} = +18.1°$ (1% in chloroform); and 3α-(4-methyl - 1 - piperazinyl)etiocholan - 17β-ol [I; B=N is α-(4-methyl-1-piperazinyl), Y is CH$_3$, X is H$_2$, Z is CH(OH-β)], M.P. 216.0–218.6° C. (corr.), when recrystallized from an acetonitrile-methanol mixture, $[\alpha]_D^{25} = +25.0°$ (1% in chloroform).

EXAMPLE 29

Etiocholan-17β-3-one was converted to its enamine with 4-hydroxypiperidine and the enamine (M.P. 180–205° C.) hydrogenated according to the procedure of Example 6. The resulting product was chromatographed on alumina to give 3β-(4-hydroxy-1-piperidyl)etiocholan-17β-ol [I; B=N is β-(4-hydroxy-1-piperidyl), Y is CH$_3$, X is H$_2$, Z is CH(OH-β)], prisms, M.P. 216.2–217.4° C. (corr.), when recrystallized from ethyl acetate containing a trace of methanol, $[\alpha]_D^{25} = +18.7°$ (1% in chloroform); and 3α-(4-hydroxy-1-piperidyl)etiocholan-17β-ol [I; B=N is α-(4-hydroxy-1-piperidyl), Y is CH$_3$, X is H$_2$, Z is CH(OH-β)], prisms, M.P. 252.8–255.0° C. (corr.), when recrystallized from methanol, $[\alpha]_D^{25} = +35.6°$ (1% in methanol).

3α-(4-hydroxy-1-piperidyl)etiocholan-17β-ol was esterified with acetic anhydride in pyridine to give 17β-acetoxy-3α-(4-acetoxy-1-piperidyl)etiocholane, M.P. 153.2–154.2° C. (corr.) when recrystallized from acetonitrile; $[\alpha]_D^{25} = +27.6°$ (1% in chloroform).

EXAMPLE 30

17α-methyletiocholan-17α-ol-3-one was converted to its enamine with 4-methylpiperazine and the enamine hydrogenated according to the procedure of Example 6. The product was separated into two isomers, 17α-methyl-3β-(4-methyl-1-piperazinyl)etiocholan - 17β - ol [I; B=N is β-(4-methyl-1-piperazinyl), Y is CH$_3$, X is H$_2$, Z is C(CH$_3$-α)(OH-β), colorless rods, M.P. 158.0–159.6° C. (corr.); and 17α-methyl-3α-(4-methyl-1-piperazinyl)-etiocholan-17β-ol [I; B=N is α-(4-methyl-1-piperazinyl), Y is CH$_3$, X is H$_2$, Z is C(CH$_3$-α)(OH-β)], colorless rods, M.P. 225.4–226.2° C. (corr.), when recrystallized from methyl ethyl ketone, $[\alpha]_D^{25} = +7.7°$ (1% in chloroform) methobromide salt, M.P. 298–299° C. (uncorr.).

EXAMPLE 31

17α-methyletiocholan - 17β-ol-3-one was converted to its enamine with 4 - methylhomopiperazine (1,4 - diazacycloheptane) and the enamine hydrogenated according to the procedure of Example 6. The product was separated into two isomers, 17α-methyl-3β-(4-methyl-1-homopiperazinyl)etiocholan-17β-ol [I; B=N is β-(4-methyl-1-homopiperazinyl), Y is CH$_3$, X is H$_2$, Z is C(CH$_3$-α)(OH-β)], M.P. 163–166° C. (uncorr.) when recrystallized from ethyl acetate, $[\alpha]_D^{25} = 0°$ (1% in chloroform); and 17α-methyl-3α-(4 - methyl - 1 - homopiperazinyl)etiocholan-17β-ol [I; B=N is α-(4-methyl-1-homopiperazinyl), Y is CH$_3$, X is H$_2$, Z is C(CH$_3$-α)(OH-β)], colorless rods, M.P. 138.6–140.0° C. (corr.) when recrystallized from a methanol acetonitrile mixture, $[\alpha]_D^{25} = +10.3°$ (1% in chloroform).

EXAMPLE 32

17α-methyletiocholan - 17β-ol-3-one can be converted to its enamine with 4 - ethylpiperidine and the enamine hydrogenated according to the procedure of Example 6 to give the 3α- and 3β-epimers of 17α - methyl - 3 - (4-ethyl-1-piperidyl)etiocholan-17β-ol [I; B=N is 4-ethyl-1-piperidyl, Y is CH$_3$, X is H$_2$, Z is C(CH$_3$-α)(OH-β)].

EXAMPLE 33

(a) 17α-methyletiocholane - 3α, 17β-diol was prepared by causing 37.1 g. of 17α - methyl - 5β-androstan - 17β-ol-3-one to react with 62.0 g. of lithium aluminum tritertiary-butoxy hydride in tetrahydrofuran solution, and was obtained in the form of colorless prisms, M.P. 166.0–167.2° C. (corr.) when recrystallized from an acetonitrile-methylene dichloride mixture; $[\alpha]_D^{25} = -3.6°$ (1% in chloroform). 17α-methyletiocholane-3α,17β-diol has been found to possess antihypertensive activity.

17α-methyletiocholane - 3α,17β-diol was acetylated with acetic anhydride in pyridine to give the 3 - acetate, colorless prisms, M.P. 150.6–151.8° C. (corr.), $[\alpha]_D^{25} = +21.0°$ (1% in chloroform).

(b) 3α-(p-toluenesulfonyloxy) - 17α-methyletiocholan-17β-ol was prepared from 20.39 g. of 17α-methyletiocholane-3α, 17β-diol and 19.0 g. of p-toluenesulfonyl chloride in 75 ml. of pyridine, fifteen hours at room temperature. The reaction mixture was quenched in water and the product collected, washed with water, dried and recrystallized from acetonitrile to give 3α-(p-toluenesulfonyloxy)-17α-methyletiocholan-17β-ol, M.P. 105–107° C. (uncorr.).

(c) 3β-dimethylamino-17α-methyletiocholan-17β-ol [I; B=N is β-(CH$_3$)$_2$N, Y is CH$_3$, X is H$_2$, Z is C(CH$_3$-α)(OH-β)].—3α-(p-toluenesulfonyloxy) - 17α - methyletiocholan-17β-ol (10.0 g.) and 25 ml. of dimethylamine were heated in a glass bomb at 100° C. for eight hours. The solvent was removed by distillation, and the residue shaken with 100 ml. of ether and 100 ml. of water. The ether layer was separated and stirred with 100 ml. of 2 N hydrochloric acid. The solid hydrochloride salt which formed was collected, washed with ether, suspended in water and treated with sodium hydroxide solution until basic. The product was extracted with ether and the ether solution washed with water, dried over anhydrous magnesium sulfate and concentrated. The residue was recrystallized from acetonitrile to give 3β-dimethylamino-17α-methyletiocholan-17β-ol, M.P. 106.4–109.8° C. (corr.).

EXAMPLE 34

3β-methylamino-17α-methyletiocholan-17β-ol [I; B=N is β-CH$_3$NH, Y is CH$_3$, X is H$_2$, Z is C(CH$_3$-α)(OH-β)] was prepared from 3α - (p-toluenesulfonyloxy)-17α-methyletiocholan-17β-ol and methylamine by the procedure of Example 33(c), and was obtained in the form of colorless prisms, M.P. 132.0–134.2° C. (corr.) when recrystallized from acetonitrile.

EXAMPLE 35

17α-methyl-3β-(4-methyl - 1 - piperazinyl)etiocholan-17β-ol [I; B=N is β-(4-methyl-1-piperazinyl), Y is CH$_3$, X is H$_2$, Z is C(CH$_3$-α)(OH-β)] was prepared from 3α-(p-toluenesulfonyloxy)-17α-methyletiocholan-17β-ol and 4-methylpiperazine, and was obtained in the form of colorless rods, M.P. 158.0–159.6° C. when recrystallized from ethyl acetate; $[\alpha]_D^{25} = -0.6°$ (1% in chloroform); bis-methobromide salt, M.P. 298.4–298.8° C. (dec.) (corr.).

EXAMPLE 36

3β - (4-hydroxy-1-piperidyl) - 17α - methyletiocholan-17β-ol [I; B=N is β-(4-hydroxy-1-piperidyl), Y is CH$_3$, X is H$_2$, Z is C(CH$_3$-α)(OH-β)] was prepared from 3α-(p-toluenesulfonyloxy)-17α-methyletiocholan-17β-ol and 4-hydroxypiperidine in dimethyl sulfoxide solution, and was obtained in the form of colorless needles, M.P. 154.6–156.8° C. (corr.) when recrystallized from ethyl acetate; $[\alpha]_D^{25} = -0.2°$ (1% in chloroform).

EXAMPLE 37

(a) 3α - (p-toluenesulfonyloxy)-17α-methyletiocholan-17β-ol (Example 33(b)) was epimerized and hydrolyzed as follows: 34.38 g. was heated in 1400 ml. of dimethylformamide for sixteen hours on a steam bath. The product was isolated and chromatographed on alumina. The column was eluted with methylene dichloride and with methylene dichloride containing increasing amounts of ether. The crystalline fractions were recrystallized from methylene dichloride-acetonitrile and from acetonitrile to give 17α-methyletiocholane-3β,17β-diol in the form of colorless needles, M.P. 177.8–181.0° C. (corr.), $[\alpha]_D^{25} = -11.9°$ (1% in chloroform); 3-acetate, M.P. 118.0–119.2° C. (corr.), $[\alpha]_D^{25} = -9.5°$ (1% in chloroform).

(b) 17α-methyl-3α-(4-hydroxy-1-piperidyl)etiocholan-17β-ol [I; B=N is α-(4-hydroxy-1-piperidyl), Y is CH₃, X is H₂, Z is C(CH₃-α)(OH-β)] was prepared from 3β-(p-toluenesulfonyloxy) - 17α - methyletiocholan-17β-ol (M.P. 122–124° C., from 17α-methyletiocholane-3β,17β-diol and p-toluenesulfonyl chloride) and 4-hydroxypiperidine heated in dimethyl sulfoxide, and had the M.P. 202.8–206.2° C. (corr.) when recrystallized from ethyl acetate; $[\alpha]_D^{25} = +7.8°$ (1% in chloroform).

EXAMPLE 38

17α - methyl-3α-(4-acetoxy-1-piperidyl)etiocholan-17β-ol [I; B=N is α-(4-acetoxy-1-piperidyl), Y is CH₃, X is H₂, Z is C(CH₃-α)(OH-β)] was prepared by acetylation of 17α-methyl-3α-(4-hydroxy-1-piperidyl)etiocholan-17β-ol with acetic anhydride in pyridine, and was obtained in the form of colorless needles, M.P. 176.6–178.4° C. (corr.), when recrystallized from ethyl acetate; $[\alpha]_D^{25} = +9.4°$ (1% in chloroform).

EXAMPLE 39

3α-dimethylaminoetiocholane [I; B=N is α-(CH₃)₂N, Y is CH₃, X is H₂, Z is CH₂].—A mixture of 11 g. of 3α-dimethylaminoetiocholan-17-one (Example 12), 9 ml. of hydrazine hydrate, 23 g. of potassium hydroxide and 100 ml. of diethylene glycol was heated at 145° C. for one hour. The mixture was then distilled in vacuo to remove excess hydrazine and refluxed for four hours (180° C.). The reaction mixture was extracted with ether, and the ether extracts were washed with water and sodium chloride solution, dried over anhydrous sodium sulfate and concentrated. The residue was dissolved in pentane and chromatographed on alumina. The product was eluted with pentane, converted to its hydrochloride salt with ethereal hydrogen chloride, and recrystallized from ethyl acetate to give 3α-dimethylaminoetiocholane in the form of its hydrochloride salt, M.P. 240.4–243.2° C. (corr.), $[\alpha]_D^{25} = +14.7°$ (1% in chloroform).

EXAMPLE 40

N-formyl-3α-methylaminoetiocholan-17β-ol [I; B=N is α-CH₃(CHO)N, Y is CH₃, X is H₂, Z is CH(OH-β)] was prepared by heating 3α-methylaminoetiocholan-17β-ol (Example 5) with performed formic-acetic anhydride (prepared from a mixture of acetic anhydride and formic acid), and was obtained in the form of colorless prisms, M.P. 233.0–234.2° C. (corr.), when recrystallized from acetonitrile; $[\alpha]_D^{25} = +44.4°$ (1% in chloroform).

EXAMPLE 41

3α-carbamylaminoetiocholan - 17β - ol [I; B=N is α-H₂NCONH, Y is CH₃, X is H₂, Z is CH(OH-β)] was prepared from 2.91 g. of 3α-aminoetiocholan-17β-ol (Example 7) and 1.06 g. of nitrourea in 50 ml. of methanol, heated one hour on a steam bath. The product separated upon cooling and was collected and recrystallized from methanol to give 3α-carbamylaminoetiocholan-17β-ol, M.P. 255.0–257.2° C. (corr.); $[\alpha]_D^{25} = +45.7°$ (1% in chloroform).

EXAMPLE 42

N-carbamyl-3α-methylaminoetiocholan-17β-ol [I; B=N is α-H₂NCO(CH₃)N, Y is CH₃, X is H₂, Z is CH(OH-β)] was prepared from 3α-methylaminoetiocholan-17β-ol (Example 5) and nitrourea by the procedure of Example 41, and was obtained in the form of colorless prisms, M.P. 241.4–242.4° C. (corr.), when recrystallized from ethyl acetate containing a trace of methanol; $[\alpha]_D^{25} = +45.5°$ (1% in chloroform).

EXAMPLE 43

3α-dimethylcarbamylaminoetiocholan-17β-ol [I; B=N is α-(CH₃)₂NCONH, Y is CH₃, X is H₂, Z is CH(OH-β)].—Dimethylcarbamyl chloride (1.62 g.) was added dropwise to 4.38 g. of 3α-aminoetiocholan-17β-ol (Example 7) in 50 ml. of pyridine. After one hour at room temperature the reaction mixture was added to 900 ml. of water and extracted with methylene dichloride. The product was chromatographed on activated magnesium silicate and eluted with ether-pentane mixtures containing increasing amounts of ether and then with ether containing 1–2% of methanol. The latter eluant brought out the desired product, 3α-dimethylcarbamylaminoetiocholan-17β-ol, tan prisms, M.P. 199.2–200.2° C. (corr.), when recrystallized from ethyl acetate; $[\alpha]_D^{25} = +38.7°$ (1% in chloroform).

EXAMPLE 44

3α - dimethylamino-17α-(3-dimethylamino-1-propynyl)etiocholan-17β-ol [I; B=N is α-(CH₃)₂N, Y is CH₃, X is H₂, Z is C(OH-β)-C≡CCH₂N(CH₃)₂-α].—A solution of 24.9 g. of 3-dimethylamino-1-propyne in 90 ml. of tetrahydrofuran was added during fifteen minutes to 90 ml. of 3 M methylmagnesium bromide in ether. The mixture was refluxed for ninety minutes and then 31.8 g. of 3α-dimethylaminoetiocholan-17-one (Example 12) in 100 ml. of tetrahydrofuran was added during fifteen minutes. The reaction mixture was refluxed for four hours and then hydrolyzed with saturated ammonium chloride solution. The product was extracted with ether and methylene dichloride and the extracts were washed with sodium chloride solution and dried over anhydrous sodium sulfate. The product was chromatographed on alumina and eluted with ether and with ether containing 0.5–2% of methanol to give 3α-dimethylamino-17α-(3-dimethylamino-1-propynyl)etiocholan-17β-ol in the form of colorless prisms, M.P. 132.2–134.0° C. (corr.) when recrystallized from acetonitrile; $[\alpha]_D^{25} = -23.5°$ (1% in chloroform).

Similarly, 7.88 g. of 3β-dimethylaminoandrostan-17-one was caused to react with 33.3 ml. of 3 M methylmagnesium bromide and 13.3 g. of 3-diethylamino-1-propyne to give 3β-dimethylamino-17α-(3-diethylamino-1-propynyl)androstan-17β-ol, colorless prisms, M.P. 107.2–110.4° C. (corr.) (recrystallized from acetonitrile); $[\alpha]_D^{25} = -30.9°$ (1% in chloroform).

EXAMPLE 45

(a) 3α-dimethylamino-17α-[3-(4-methyl-1-piperazinyl)-1-propynyl]etiocholan-17β-ol [I; B=N is α-(CH₃)₂N, Y is CH₃, X is H₂, Z is C(OH-β)-C≡CCH₂(4-methyl-1-piperazinyl)].—3-(4-methyl-1-piperazinyl) - 1 - propyne (11.8 g.) (B.P. 190–191° C., prepared from propargyl bromide and N-methylpiperazine in ether) and 1.84 g. of lithium amide in 160 ml. dry dioxane was heated at reflux in a nitrogen atmosphere for one hour. 3α-dimethylaminoetiocholan-17-one (12.7 g.) (Example 12) in 25 ml. of dioxane was then added during twenty minutes and the mixture refluxed for four hours. The product was isolated, chromatographed on alumina and eluted with ether and with ether containing 1% of methanol to give 3α-dimethylamino-17α-[13 - (4-methyl-1-piperazinyl)-1-propynyl]etiocholan-17β-ol in the form of colorless rods, M.P.

120.6–123.2° C. (corr.), when recrystallized from n-hexane; $[\alpha]_D^{25} = -12.6°$ (1% in chloroform).

(b) 3α-dimethylamino-17α-[3-(4-methyl-1-piperazinyl)-1-propenyl[etiocholan-17β-ol [I; B=N is α-(CH₃)₂N, Y is CH₃, X is H₂, Z is C(OH-β)-CH=CHCH₂(4-methyl-1-piperazinyl)].—3α - dimethylamino-17α - [3-(4-methyl-1-piperozinyl)-1-propynyl]etiocholan-17β-ol (9.1 g.) in 300 ml. of pyridine was hydrogenated in the presence of 1.0 g. of 30% palladium hydroxide on strontium carbonate catalyst until one mole of hydrogen had been absorbed. The product was isolated and treated with ethanolic hydrogen chloride to give 3α-dimethylamino-17α-[3-(4-methyl-1-piperazinyl)-1-propenyl]etiocholan-17β-ol in the form of its trihydrochloride salt, M.P. 270.0–270.4° C. (dec.) (corr.) when recrystallized from a methanolethyl acetate mixture; $[\alpha]_D^{25} = +58.4°$ (1% in ethanol).

(c) 3α-dimethylamino-17α-[3-(4-methyl-1-piperazinyl)propyl]etiocholan-17β-ol [I; B=N is α-(CH₃)₂N, Y is CH₃, X is H₂, Z is C(OH-β)CH₂CH₂CH₂(4-methyl-1-piperazinyl)].—3α-dimethylamino - 17α - [3-(4-methyl-1-piperazinyl)-1-propynyl)etiocholan-17β-ol (9.1 g.) in 300 ml. of ethanol was hydrogenated in the presence of 2.0 g. of 10% palladium-on-carbon catalyst until two moles of hydrogen had been absorbed. The product was isolated and treated with ethanolic hydrogen chloride to give 3α-dimethylamino-17α-[3 - (4-methyl-1-piperazinyl)propyl] etiocholan-17β-ol in the form of its trihydrochloride salt, M.P. 253.0–265.0° C. (dec.) (corr.) when recrystallized from a methanol-ethyl acetate mixture and from ethanol; $[\alpha]_D^{25} = +11.8°$ (1% in ethanol).

EXAMPLE 46

A solution of 10.6 g. of etiocholan-17β-ol-3-one and 5.3 g. of 2-dimethylaminoethylamine in 300 ml. of 95% ethanol was hydrogenated in the presence of 2 g. of 10% palladium-on-carbon catalyst. The mixture was filtered and concentrated, and the residue chromatographed on alumina. The chromatograph column was eluted with ether and then with ether containing 0.5–4% methanol. The first compound to be eluted was 3β-(2-dimethylaminoethylamino)etiocholan-17β-ol [I; B=N is

β-(CH₃)₂NCH₂CH₂NH

Y is CH₃, X is H₂, Z is CH(OH-β)], colorless prisms, M.P. 92.8–97.0° C. (recrystallized from acetonitrile), $[\alpha]_D^{25} = +15.6°$ (1% in chloroform); and the second compound to be eluted was 3α-(2-dimethylaminoethylamino)etiocholan-17β-ol [I; B=N is

α-(CH₃)₂NCH₂CH₂NH

Y is CH₃, X is H₂, Z is CH(OH-β)], colorless needles, M.P. 149.0–151.0° C. (corr.) (recrystallized from acetonitrile), $[\alpha]_D^{25} = +22.1°$ (1% in chloroform).

EXAMPLE 47

3α - (3 - dimethylaminopropylamino)etiocholan-17β-ol [I; B=N is α-(CH₃)₂NCH₂CH₂CH₂NH, Y is CH₃, X is H₂, Z is CH(OH-β)] was prepared by reductive amination of etiocholan-17β-ol-3-one with 3-dimethylaminopropylamine by the procedure of Example 46, and was obtained as a colorless solid, M.P. 102.2–103.0° C. (corr.) when recrystallized from acetonitrile; $[\alpha]_D^{25} = +23.4°$ (1% in chloroform). The isomeric 3β-(3-dimethylaminopropylamino)etiocholan-17β-ol was also isolated, in the form of its hydrochloride salt, M.P. above 320° C. (decomposition) when recrystallized from methanol;

$[\alpha]_D^{25} = +16.1°$ (1% in methanol).

3β - (3 - dimethylaminopropylamino)etiocholan-17β-ol was N-methylated by the procedure described below in Example 50 to give 3β-[N-methyl-N-(3-dimethylaminopropyl)]aminoetiocholan-17β-ol, colorless prisms, M.P. 124.0–125.6° C. (corr.) when recrystallized from acetone; $[\alpha]_D^{25} = +19.4°$ (1% in chloroform).

Similarly 3α-(3-dimethylaminopropylamino)etiocholan-17β-ol was N-methylated to give 3α-[N-methyl-N-(3-dimethylaminopropyl)]aminoetiocholan - 17β-ol, colorless needles, M.P. 110.6–112.0° C. (corr.); $[\alpha]_D^{25} = +13°$ (1% in chloroform).

EXAMPLE 48

16α - bromo-3α-dimethylaminoetiocholan-17-one—Cupric bromide (4.46 g.) and 3.18 g. of 3α-dimethylaminoetiocholan-17-one (Example 12) in 300 ml. of dry methanol was heated under reflux for one day. An additional 4.46 g. of cupric bromide was added and the mixture heated for one day longer. The product, 16α-bromo-3α-dimethylaminoeiocholan-17-one, had the M.P. 139–146° C. (uncorr.).

Similarly, using cupric chloride in refluxing ethanol, 3α-dimethylaminoeiocholan-17-one was converted to 16α-chloro-3α-dimethylaminoetiocholan-17-one, M.P. 139.4–144.2° C. (corr.) when recrystallized from n-hexane; $[\alpha]_D^{25} = +112.1°$ (1% in chloroform).

16α - bromo - 3α-dimethylaminoetiocholan-17-one was converted to its 17-ethylene glycol ketal by heating it with ethylene glycol in the presence of p-toluenesulfonic acid in toluene solution. The ketal was then heated with potassium tertiary-butoxide in xylene solution to produce the ethylene glycol ketal of 3α-dimethylamino-15-etiocholen-17-one, and the latter in turn hydrolyzed in acetic acid to give 3α-dimethylamino-15-etiocholen-17-one.

EXAMPLE 49

3α - (4-hydroxy-1-piperidyl)-4β-methyletiocholan-17β-ol can be prepared by reductive amination of 4β-methyletiocholan-17β-ol-3-one, M.P. 114.0–114.6° C. (corr.) (prepared by methylation of etiocholan-17β-ol-3-one with methyl iodide in the presence of potassium tertiary-butoxide), with 4-hydroxypiperidine.

EXAMPLE 50

(a) 3β - [N-methyl-N-(2-dimethylaminoethyl)amino] etiocholan-17β-ol [I; B=N is

β-(CH₃)₂NCH₂CH₂N(CH₃)

Y is CH₃, X is H₂, Z is CH(OH-β)].—3β-(2-dimethylamino)etiocholan-17β-ol (Example 46) (10.0 g.), 50 ml. of 37% formic acid and 50 ml. of 98% formic acid were heated on a steam bath for twenty hours. The reaction mixture was added to 1.5 liters of cold water and excess sodium hydroxide was added. The product was extracted with ether, an the ether extracts were washed with water, dried, filtered and concentrated. The residue was recrystallized from acetonitrile to give 3β-[N-methyl-N-(2-dimethylaminoethyl)amino]etiocholan-17β-ol in the form of colorless prisms, M.P. 143.5–145.0° C. (cor.);

$[\alpha]_D^{25} = +18.9°$ (1% in chloroform).

(b) Similarly, 3α-[N-methyl-N-(2-dimethylaminoethyl)amino]etiocholan-17β-ol [I; B=N is

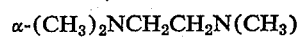
α-(CH₃)₂NCH₂CH₂N(CH₃)

Y is CH₃, X is H₂, Z is CH(OH-β)] was prepared by heating 3α-(2-dimethylaminoethylamino)etiocholan-17β-ol with formic acid and formaldehyde and it was obtained in the form of its dihydrochloride salt, M.P. 288.0–288.2° C. (decomposition) when recrystallized from a mixture of methanol and ethyl acetate, $[\alpha]_D^{25} = +28.8°$ (1% in chloroform).

EXAMPLE 51

17α-methyletiocholan-17β-ol-3-one was converted to its enamine with 4-carbethoxypiperazine and the enamine hydrogenated according to the procedure of Example 6. The product was separated into two isomers, 17α-methyl-3α - (4 - carbethoxy-1-piperazinyl)etiocholan-17β-ol [I; B=N is α-(4-carbethoxy-1-piperazinyl), Y is CH₃, X is H₂, Z is C(CH₃-α)(OH-β)], colorless rods, M.P. 170.0–173.6° C. (corr.), when recrystallized from ethyl acetate, $[\alpha]_D^{25}=+9.8°$ (1% in chloroform); and 17α-methyl-3β-(4-carbethoxy-1-piperazinyl)etiocholan-17β-ol [I; B=N is β-(4-carbethoxy-1-piperazinyl), Y is $CH_3$, X is $H_2$, Z is C($CH_3$-α)(OH-β)], M.P. 154.7° C. when recrystallized from acetonitrile.

EXAMPLE 52

Etiocholan-17β-ol-3-one was converted to its enamine with 4-(2-hydroxyethyl)piperazine and the enamine hydrogenated according to the procedure of Example 6. The product was separated into two isomers, 3α-[4-(2-hydroxyethyl)-1-piperazinyl]etiocholan-17β-ol [I; B=N is α-[4-(2-hydroxyethyl)-1-piperazinyl], Y is $CH_3$, X is $H_2$, Z is CH(OH-β)], colorless flakes, M.P. 201.6-202.2° C. (corr.) when recrystallized from ethyl acetate, $$[\alpha_{6D}^{25}=+25.4°$$

(1% in chloroform); and 3β-[4-(2-hydroxyethyl)-1-piperazinyl]etiocholan-17β-ol [I; B=N is β-[4-(2-hydroxyethyl)-1-piperazinyl], Y is $CH_3$, X is $H_2$, Z is CH(OH-β)].

EXAMPLE 53

17α-methylietiocholan-17β-ol-3-one was converted to its enamine with 3-hydroxypiperidine and the enamine hydrogenated according to the procedure of Example 6 to give 17α - methyl - 3ε-(3-hydroxy-1-piperidyl)etiocholan-17β-ol [I; B=N is 3-hydroxy-1-piperidyl, Y is $CH_3$, X is $H_2$, Z is C($CH_3$-α)(OH-β)], M.P. 203.2-204.6° C. (corr.) when recrystallized from methanol and ethyl acetate, $[\alpha]_D^{25}=+17.1°$ (1% in chloroform).

EXAMPLE 54

17α-methyletiocholane-11α, 17β-diol-3-one was converted to its enamine with 4-methylpiperazine and the enamine hydrogenated according to the procedure of Example 6. The product was separated into two isomers, 17α - methyl - 3α - (4-methyl-1-piperazinyl)etiocholane-11α, 17β-diol [I; B=N is α-(4-methyl-1-piperazinyl), Y is $CH_3$, X is (H)(OH-α), Z is C($CH_3$-α)(OH-β)], M.P. 275.0-275.8° C. (corr.) when recrystallized from methanol, $[\alpha]_D^{25}=+10.5°$ (1% in chloroform); and 17α-methyl - 3β - (4 - methyl-1-piperazinyl)etiocholane-11α, 17β-diol [I; B=N is β-(4-methyl-1-piperazinyl), Y is $CH_3$, X is (H)(OH-α), Z is C($CH_3$-α)(OH-β)], M.P. 202.0-204.6° C. (corr.) when recrystallized from methanol and acetonitrile.

Etiocholane-11β,17β-diol - 3 - one or etiocholan-17β-ol-3-11-dione can be converted to its enamine with piperidine and the enamine hydrogenated according to the procedure of Example 6 to give, respectively, 3-α- and 3β-(1-piperidyl)etiocholane-11β,17β-diol [I; B=N is 1-piperidyl, Y is $CH_3$, X is (H)(OH-β), Z is CH(OH-β)], or 3α- and 3β-(1 - piperidyl)etiocholan - 17β-ol-11-one [I; B=N is 1-piperidyl, Y is $CH_3$, X is O, Z is CH(OH-β)].

EXAMPLE 55

17α-methyletiocholan-17β-ol-3-one was converted to its enamine with morpholine and the enamine hydrogenated according to the procedure of Example 6. The product was separated by chromatography on alumina into two isomers, 17α - methyl - 3β-(4-morpholinyl)etiocholan-17β-ol [I; B=N is β-(4-morpholinyl), Y is $CH_3$, X is $H_2$, Z is C($CH_3$-α)(OH-β)], colorless rods, M.P. 185.0-187.8° C. (corr.) when recrystallized from ethyl acetate, $[\alpha]_D^{25}=-1.7°$ (1% in chloroform); and 17α-methyl-3α - (4-morpholinyl)etiocholan-17β-ol [I; B=N is α-(4-morpholinyl), Y is $CH_3$, X is $H_2$, Z is C($CH_3$-α)(OH-β)], colorless needles, M.P. 178.8-180.0° C. (corr.) when recrystallized from ethyl acetate, $[\alpha]_D^{25}=+7.90°$ (1% in chloroform).

EXAMPLE 56

3β - methylamino- 4β - methyletiocholan-17β-ol 17-acetate.—4β - methyletiocholan - 17β-ol-3-one 17-acetate (10.0 g.), 0.5 g. of p-toluenesulfonic acid monohydrate and 1000 ml. of benzene were refluxed in an atmosphere of nitrogen in a water separator while methylamine was bubbled through at a moderate rate. After one hour 0.5 g. of sulfosalicylic acid was added and the refluxing continued until the mixture was distilled nearly to dryness. Toluene (1 liter) and 1.5 g. of sulfosalicylic acid were then added and the introduction of methylamine and refluxing continued for several hours. The reaction mixture was cooled, filtered, concentrated to about 150 ml., diluted to 300 ml. with benzene and hydrogenated in the presence of 3.0 g. of 10% palladium-on-carbon catalyst. The product was isolated and recrystallized from acetonitrile to give 3β - methyl-amino-4β-methyletiocholan-17β-ol 17-acetate, colorless needles, M.P. 138.0-139.5° C. (corr.); $[\alpha]_D^{25}=+24.1°$ (1% in chloroform); infrared absorption at 3.42, 3.49, 3.60, 5.54, 5.75, 6.89, 8.10 and 9.74μ.

EXAMPLE 57

(a) 4β-methyletiocholan-17β-ol-3-one oxime was prepared by heating 4β-methyletiocholan-17β-ol-3-one with excess hydroxylamine hydrochloride in pyridine-ethanol solution. The oxime was obtained in the form of colorless bladelike prisms, M.P. 204.0-208.0° C. (corr.) when recrystallized from acetonitrile containing a little methanol; $[\alpha]_D^{25}=+66.4°$ (1% in methanol).

(b) 17β-acetoxy-4β-methyletiocholan-3-one oxime was prepared by causing 17β-acetoxy-4β-methyletiocholan-3-one to react with excess hydroxylamine hydrochloride. The oxime had the M.P. 184.2-185.2° C. (corr.) when recrystallized from acetonitrile; $[\alpha]_D^{25}=+60.2°$ (1% in chloroform).

(c) 3α - amino - 4β-methyletiocholan-17β-ol was prepared by reduction of 17β-acetoxy-4β-methyletiocholan-3-one oxime with sodium in isoamyl alcohol according to the procedure of Example 7(a). The product had the M.P 222.3-225.0° C. (corr.) when recrystallized from methanol and from isopropyl alcohol; $[\alpha]_D^{25}=-3.5°$ (1% in chloroform).

(d) A mixture of epimers of 3-amino-4β-methyletiocholan - 17β - ol, obtained by catalytic reduction of 4β-methyletiocholan-17β-ol-3-one oxime, was N-methylated with formic acid and formaldehyde according to the procedure of Example 9. The product was purified by percolation through activate magnesium silicate and chromatography on alumina to give 3α - dimethylamino - 4β-methyletiocholan-17β-ol in the form of colorless blades, M.P. 122.6-124.6° C. (corr.) when recrystallized from acetonitrile; $[\alpha]_D^{25}=-27.4°$ (1% in chloroform).

EXAMPLE 58

(a) Reductive amination of pregnan-17α-ol-3,11,20-trione with dimethylamine in the presence of palladium-on carbon catalyst according to the procedure of Example 46 and fractional crystallization of the product from acetonitrile and methanol gave 3β-dimethylaminopregnan-17α-ol-11,20-dione, M.P. 133.5-135.0° C. (corr.), $[\alpha]_D^{25}=+24.3°$ (1% in chloroform); and 3α-dimethylaminopregnan-17α-ol-11,20-dione, colorless rods, M.P. 208.0-210.5° C. (corr.), $[\alpha]_D^{25}=+43.0°$ (1% in chloroform).

(b) 3β - dimethylaminopregnane - 17α,20 - diol-11-one was prepared by reduction of 10.3 g. of 3β-dimethylaminopregnan-17α-ol-11,20-dione with 2.06 g. of sodium borohydride in 50 ml. of tetrahydrofuran and 50 ml. of absolute ethanol. The product was collected by filtration, had a M.P. above 280° C. and was used without further purification in the next reaction.

(c) 3β - dimethylaminoetiocholane - 11,17 - dione [I; B=N is β-($CH_3$)$_2$N, Y is $CH_3$, X is O, Z is C=O.—A mixture of 6.35 g. of 3β-dimethylaminopregnane-17α,20-diol-11-one, 150 ml. of acetic acid and 7.77 g. of lead tetraacetate was allowed to stand at room temperature for sixteen hours. Ethylene glycol (10 ml.) was then added and the mixture stirred fifteen minutes. The reaction mixture was concentrated by distillation, 500 ml.

of water added, and made basic with sodium hydroxide. The product was collected by filtration, triturated with methylene dichloride and recrystallized from ethyl acetate to give 3β-dimethylaminoethiocholane-11,17-dione, M.P. 212.5–215.5° C. (corr.), $[\alpha]_D^{25} = +129.4°$ (1% in chloroform).

EXAMPLE 59

(a) Formylhydrazone of 17β - acetoxyetiocholan - 3-one.—A mixture of 33.2 g. of 17β-acetoxyetiocholan-3-one, 6.60 g. of formylhydrazine, 250 ml. of ethanol and 2 drops of acetic acid was refluxed for six hours and then kept at room temperature overnight. There was thus obtained 29.9 g. of the formylhydrazone of 17β-acetoxyetiocholan-3-one, M.P. 208–211° C. (uncorr.).

(b) 17β - acetoxy - 3ϵ-(2 - formyl - 1-hydrazino)etiocholane [I; B═N is HCONHNH, Y, is CH₃, X is H₂, Z is CH(OCOCH₃-β)].—A solution of 14.98 g. of the formylhydrazone of 17β-acetoxyetiocholan-3-one in 300 ml. of acetic acid was hydrogenated in the presence of 1.00 g. of platinum oxide catalyst. The mixture was filtered, concentrated in vacuo, and the residue made alkaline with dilute sodium hydroxide and extracted with ether. The ether extracts were washed with sodium chloride solution, dried over anhydrous magnesium sulfate and concentrated. The residue was recrystallized from ethyl acetate to give 17β-acetoxy-3ϵ-(2-formyl-1-hydrazino)etiocholane, colorless plates, M.P. 158.0–159.4° C. (corr.); $[\alpha]_D^{25} = +14.4°$ (1% in chloroform).

Chromatography of the material from the ethyl acetate mother liquors on alumina permitted isolation of the epimeric 17β - acetoxy - 3ϵ-(2-formyl-1-hydrazino)etiocholane, M.P. 183.4–185.0° C. (corr.) when recrystallized from methanol; $[\alpha]_D^{25} = +28.9°$ (1% in chloroform).

EXAMPLE 60

Reductive amination of etiocholan-17β-ol-3-one with 2-morpholinoethylamine according to the procedure of Example 46 gave 3β-(2-morpholinoethylamino)etiocholane-17β-ol [I; B═N is β-(morpholinoethylamino), Y is CH₃, X is H₂, Z is CH(OH-β)], obtained in the form of its dihydrochloride salt, prisms, M.P. above 300° C. (corr.) when recrystallized from methanol, $$[\alpha]_D^{25} = +15.8°$$

(1% in water); and 3α-(2-morpholinoethylamino)etiocholan-17β-ol [I; B═N is α-(morpholinoethylamino), Y is CH₃, X is H₂, Z is CH(OH-β)], colorless needles, M.P. 147.2–150.0° C. (corr.) when recrystallized from ethyl acetate, $[\alpha]_D^{25} = +19.3°$ (1% in chloroform).

EXAMPLE 61

Reductive amination of etiocholan-17β-ol-3-one with 2-(2-pyridyl)ethylamine according to the procedure of Example 46 gave 3β - [2 - (2-pyridyl)ethylamino]etiocholan-17β-ol [I; B═N is β-[2-(2-pyridyl)ethylamino], Y is CH₃, X is H₂, Z is CH(OH-β)], colorless rods, M.P. 126.6–128.0° C. (corr.) when recrystallized from acetonitrile, $[\alpha]_D^{25} = +14.4°$ (1% in chloroform); and 3α-[2-(2-pyridyl)ethylamino]etiocholan-17β-ol [I; B═N is α-[2-(2-pyridyl)ethylamino], Y is CH₃, X is H₂, Z is CH(OH-β)], colorless needles, M.P. 158.0–158.0° C. (corr.) when recrystallized from acetone, $[\alpha]_D^{25} = +23.7°$ (1% in chloroform).

EXAMPLE 62

Reductive amination of 17α-methyletiocholan-17β-ol-3-one with 3-dimethylaminopropylamine according to the procedure of Example 46 gave 3α(3-dimethylaminopropylamino)-17α-methyletiocholan-17β-ol [I; B═N is α-(CH₃)₂NCH₂CH₂CH₂NH, Y is CH₃, X is H₂, Z is C(α-CH₃)(OH-β)], colorless prisms, M.P. 122.0–123.8° C. (corr.) when recrystallized from acetone, $$[\alpha]_D^{25} = +6.1°$$

(1% in chloroform); and 3β-(3-dimethylaminopropylamino)-17α-methyletiocholan-17β-ol [I; B═N is $$\beta\text{-}(CH_3)_2NCH_2CH_2CH_2NH$$

Y is CH₃, X is H₂, Z is C(α-CH₃)(OH-β)], obtained in the form of its dihydrochloride salt, M.P. above 300° C. (corr.) when recrystallized from an isopropyl alcohol-methanol mixture, $[\alpha]_D^{25} = +0.1°$ (1% in ethanol).

3α-(3 - dimethylaminopropylamino) - 17α - methyletiocholan-17β-ol or 3β-(3-dimethylaminopropylamino)-17α-methyletiocholan-17β-ol can be N-methylated with formic acid and formaldehyde according to the procedure of Example 50 to give, respectively, 3α-[N-methyl-N-(3-dimethylaminopropyl)amino] - 17α - methyletiocholan-17β-ol [I; B═N is α-(CH₃)₂NCH₂CH₂CH₂N(CH₃), Y is CH₃, X is H₂, Z is C(α-CH₃)(OH-β)] or 3β-]N-methyl-N-(3-dimethylaminopropyl)amino] - 17α - methyletiocholan-17β-ol [I; B═N is β-(CH₃)₂NCH₂CH₂CH₂N(CH₃), Y is CH₃, X is H₂, Z is C(α-CH₃)(OH-β)].

EXAMPLE 63

Reductive amination of etiocholan-17β-ol-3-one with 4-dimethylaminobutylamine according to the procedure of Example 46 gave 3α-(4-dimethylaminobutylamino)-etiocholan-17β-ol [I; B═N is $$\alpha\text{-}(CH_3)_2NCH_2CH_2CH_2CH_2NH$$

Y is CH₃, X is H₂, Z is CH(OH-β)], M.P. 109.8–111.4° C. (corr.) when recrystallized from acetone, $$[\alpha]_D^{25} = -3.1°$$

(1% in chloroform).

3α-(4-dimethylaminobutylamino)etiocholan - 17β - ol can be N-methylated with formic acid and formaldehyde according to the procedure of Example 50 to give 3α-[N-methyl-N - (4-dimethylaminobutyl)amino]etiocholan-17β-ol [I; B═N is α-(CH₃)₂NCH₂CH₂CH₂CH₂N(CH₃), Y is CH₃, X is H₂, Z is CH(OH-β)].

EXAMPLE 64

11α - acetoxy-3α-dimethylamino-17α-methyletiocholan-17β-ol [I; B═N is α-(CH₃)₂N, Y is CH₃, X is $$(H)(OCOCH_3\alpha)$$

Z is C(α-CH₃)(OH-β)] was prepared by reductive amination of 11α-acetoxy-17α-methyletiocholan-17β - ol - 3-one with dimethylamine according to the procedure of Example 46, and it had the M.P. 179.2–180.4° C. (corr.) when recrystallized from ethyl acetate, $[\alpha]_D^{25} = -28.1°$ (1% in chloroform).

11α-acetoxy-3α-dimethylamino-17α - methyletiocholan-17β-ol (11.4 g.), 4.0 g. of 85% potassium hydroxide and 100 ml. of 95% ethanol were refluxed two hours, cooled, poured into 1.5 liters of water and the product collected by filtration to give 3α-dimethylamino-17α-methyletiocholane-11α,17β-diol, M.P. 115° C. (uncorr.).

EXAMPLE 65

(a) The 11-p-toluenesulfonate ester of 3α-dimethylamino-17α-methyletiocholane-11α, 17β-diol was prepared by treating 9.98 g. of the 11-hydroxy compound with 11.45 g. of p-toluenesulfonyl chloride in 60 ml. of pyridine. After forty-three hours at room temperature the mixture was added to an excess of dilute sodium hydroxide and the crystalline product collected by filtration.

(b) 3α-dimethylamino-17α - methyl - 9(11) - etiocholen - 17β - ol.—The 11-p-toluenesulfonate ester of 3α - dimethylamino-17α - methyletiocholane - 11α, 17β-diol (10.28 g.) was added to a near boiling solution of 10.0 g. of fused sodium acetate in 100 ml. of acetic acid. The mixture was boiled for thirty minutes, cooled, and poured into 1.5 liters of ice-water containing 80 g. of sodium hydroxide. Additional sodium hydroxide was added until the mixture had pH 10, and the solid product was collected by filtration. The product was dissolved in ether and percolated through activated magnesium silicate. The eluants were concentrated and the residue recrystallized from acetonitrile to give 3α - dimethylamino-17α-methyl-9(11)-etiocholen-17β-ol, colorless blades, M.P. 112.2–113.4° C. (corr.), $[\alpha]_D^{25}=+0.5°$ (1% in ethanol).

EXAMPLE 66

(a) 17α - methyl-9(11)-etiocholen - 17β-ol-3-one.—17α-methyl-4,9(11)-androstadien - 17β - ol - 3-one (25.77 g.) and 10 g. of 85% potassium hydroxide in 200 ml. of methanol was hydrogenated in the presence of 2.0 g. of palladium-on-carbon catalyst until one mole of hydrogen had been absorbed. The mixture was filtered, 10 ml. of acetic acid added, and the filtrate concentrated. The residue was dissolved in methylene dichloride and chromatographed on activated magnesium silicate. The material from the eluants was recrystallized from acetonehexane to give 16 g. of 17α-methyl - 9(11) - etiocholen-17β-ol-3-one, M.P. 130–137° C. (uncorr.).

(b) 3α-dimethylamino-17α-methyl - 9(11) - etiocholen-17β-ol was prepared by reductive amination of 17α-methyl-9(11)-etiocholen-17β-ol-3-one with dimethylamine according to the procedure of Example 46. The product obtained was identical with that of Example 65(b).

EXAMPLE 67

3α(4 - hydroxypiperidino)-17α-methyletiocholane-11α,17β-diol [I; B=N is α-(4-hydroxypiperidino), Y is CH₃, X is (H)(OH-α), Z is C(α-CH₃)(OH-β)] was prepared by reductive amination of 17α - methyletiocholane-11α,17β-diol-3-one according to the procedure of Example 46, and it was obtained as colorless prisms, M.P. 220.0–223.0° C. (corr.) when recrystallized from acetonitrile, $[\alpha]_D^{25}=-4.2°$ (1% in chloroform).

EXAMPLE 68

17α-methyl-9(11)-etiocholen-17β-ol - 3 - one was converted to its enamine with 4-hydroxypiperidine according to the procedure of Example 6(a), and the enamine reduced with sodium borohydride in tetrahydrofuran solution. The product was isolated and recrystallized from a methanol-acetonitrile mixture to give 3α-(4-hydroxy-1-piperidyl) - 17α - methyl-9(11)-etiocholen-17β-ol, M.P. 221.4–223.0° C. (corr.); $[\alpha]_D^{25}=+7.4°$ (1% in chloroform).

EXAMPLE 69

17α-ethynyletiocholan-17β-ol-3-one was converted to its enamine with 4-hydroxypiperidine according to the procedure of Example 6(a), and the enamine reduced with sodium borohydride. The product was separated into the two epimers by chromatography on alumina. There was thus obtained 17α-ethynyl-3α-(4-hydroxy-1-piperidyl)etiocholan-17β-ol [I; B=N is α-(4-hydroxy-1-piperidyl), Y is CH₃, X is H₂, Z is C(α-C≡CH)(OH-β)], prisms, M.P. 179.0–181.0° C. (corr.) when recrystallized from acetonitrile; $[\alpha]_D^{25}=-2.5°$ (1% in chloroform); and 17α-ethynyl-3β-(4 - hydroxy - 1 - piperidyl)etiocholan-17β-ol [I; B=N is β-(4-hydroxy-1-piperidyl), Y is CH₃, X is H₂, Z is C(α-C≡CH)(OH-B)], M.P. 193–197° C. (uncorr.) when recrystallized from acetonitrile.

EXAMPLE 70

3α - dimethylamino - 17α - methyl - 9(11)-etiocholan-17β-ol N-oxide was prepared from 3α - dimethylamino-17α - methyl-9(11)-etiocholen-17β-ol (Example 65) and hydrogen peroxide according to the method of Example 13, and it had the M.P. 200.0–200.8° C. (dec.) (corr.) when recrystallized from a methanol-acetonitrile mixture, $[\alpha]_D^{25}=+1.9°$ (1% in chloroform).

EXAMPLE 71

(a) 17α - (3 - hydroxy - 1 - propynyl)etiocholan-17β-ol - 3-one ethylene glycol ketal.—Potassium (7.8 g.) was added in small pieces during ten minutes to 250 ml. of stirred liquid ammonia in a nitrogen atmosphere. Propargyl alcohol (11.35 g.) was then added during fifteen minutes, followed by 33.25 g. of etiocholane-3,17-dione 3-ethylene glycol ketal in 200 ml. of pyridine. The reaction mixture was warmed gently until the internal temperature was −10° C. and then kept at room temperature overnight. The mixture was added to 1.5 liters of water containing 16.7 ml. of concentrated hydrochloric acid and extracted with methylene dichloride. The extracts were washed with water, dried over anhydrous sodium sulfate and the solvent evaporated.

(b) 17α - (3 - hydroxy - 1 - propynyl)etiocholan-17β-ol-3-one.—The product from part (a) was heated on a steam bath in 100 ml. of 80% acetic acid for thirty minutes. The mixture was made basic and the solid product collected by filtration and dissolved in ethyl acetate. The ethyl acetate solution was dried over anhydrous sodium sulfate, filtered and concentrated to give 14.5 g. of 17α-(3 - hydroxy - 1-propynyl)etiocholan-17β-ol-3-one, M.P. 200–209° C. (uncorr.).

(c) 17α - (3 - hydroxy - 1-propynyl)etiocholan-17β-ol-3-one was converted to its enamine with 4-hydroxypiperidine according to the procedure of Example 6(a), and the enamine reduced with sodium borohydride to give 3α- and 3β-(4-hydroxy-1-piperidyl)-17α-(3-hydroxy-1-propynyl)etiocholan-17β-ol.

EXAMPLE 72

17β - acetoxy - 3α-dimethylaminoetiocholan-7α-ol was prepared by reductive amination of 6.88 g. of 17β-acetoxyetiocholan-17β-ol-3-one (M.P. 171–179° C., prepared by hydrogenation of 17β - acetoxy-6α,7α-epoxy-4-androsten-3-one) with 25 ml. of dimethylamine in 275 ml. of ethanol in the presence of 2.0 g. of 10% palladium-on-carbon catalyst. The product was recrystallized from acetonitrile and was obtained in the form of colorless rods, M.P. 190.0–193.8° C. (corr.); $[\alpha]_D^{25}=+2.2°$ (1% in chloroform).

According to the procedure of Example 6, etiocholane-6α,17β - diol - 3 - one, etiocholane - 7β,17β - diol-3-one, etiocholane - 12β,17β - diol-3-one, 8-etiocholen-17β-ol-3-one, 1α - methyletiocholan-17β-ol-3-one, 2α-methyletiocholan - 17β-ol-3-one, 5β-methyletiocholan-17β-ol-3-one, 6α-methyletiocholan-17β-ol-3-one, 7β - methyletiocholan-17β - ol - 3 - one, 16α-methyletiocholan-17β-ol-3-one, or 19-noretiocholan-17β-ol-3-one can be caused to react with 4-hydroxypiperidine and the resulting enamine catalytically hydrogenated to give, respectively, the 3α- and 3β - epimers of 3-(4-hydroxy-1-piperidyl)etiocholane-6α,17β-diol, 3 - (4-hydroxy-1-piperidyl)etiocholane-7β,17β-diol, 3 - (4-hydroxy-1-piperidyl)etiocholane-12β,17β-diol, 3 - (4 - hydroxy-1-piperidyl)-8-etiocholen-17β-ol, 3-(4-hydroxy - 1 - piperidyl) - 1α - methyletiocholan-17β-ol, 3-(4-hydroxy-1-piperidyl) - 2α - methyletiocholan-17β-ol, 3-(4-hydroxy-1-piperidyl)-5β - methyletiocholan - 17β-ol, 3-(4-hydroxy-1-piperidyl)-6α-methyletiocholan - 17β - ol, 3 - (4 - hydroxy - 1 - piperidyl) - 7β-methyletiocholan-17β-ol, 3-(4-hydroxy-1-piperidyl) - 16α-methyletiocholan-17β-ol, or 3-(4-hydroxy-1-piperidyl)-19 - noretiocholan-17β-ol.

According to the procedure of Example 1, 6-etiocholen-17β - ol - 3-one can be caused to react with dimethylformamide and formic acid to give 3α- and 3β-dimethylamino-6-etiocholen-17β-ol.

According to the procedure of Example 1, etiocholane-12β,17β-diol-3-one or etiocholane-7β,17β-diol-3-one can be caused to react with dimethylformamide and formic acid to give, respectively, 3α- and 3β-dimethylaminoetiocholane-12β,17β-diol, or 3α- and 3β-dimethylaminoetiocholane-7β,17β-diol. The latter can be converted to the 12-p-toluenesulfonic acid esters and cleaved by heating with sodium acetate in acetic acid according to the procedure of Example 65, to give 3α- and 3β-dimethylamino - 11 - etiocholen-17β-ol, or 3α- and 3β-dimethylamino-7-etiocholen-17β-ol. 3α- and 3β-dimethylamino-7-etiocholen-17β-ol can be isomerized under hydrogenation conditions and by acid treatment to give 3α- and 3β-dimethylamino-8(14) - etiocholen - 17β-ol, and 3α- and 3β-dimethylamino-14(15)-etiocholen-17β-ol.

EXAMPLE 73

(a) 3β-dimethylamino - 16 - ( 4- methoxybenzylidene) androstan - 17-one [V; B=N is β-(CH$_3$)$_2$N, R is CHC$_6$H$_4$OCH$_3$-4, Y is CH$_3$, X is H$_2$, Z' is C=O].— Anisaldehyde (2.72 g. was added to a solution of 3.18 g. of 3β-dimethylaminoandrostan-17-one (Example 10) and 0.66 g. of potassium hydroxide in 30 ml. of dry methanol. The mixture was heated at reflux for one hour, cooled to room temperature, and the crystalline product collected by filtration. The latter was recrystallized twice from isopropyl alcohol to give 3β-dimethylamino-16(4-methoxybenzylidene)androstan - 17-one in the form of colorless plates, M.P. 192.6–193.4° C. (corr.), [α]$_D^{25}$=+25.4° (1% in chloroform); ultraviolet maxima at 234 and 322 mμ (E=8,400 and 28,300).

3β-dimethylamino - 16-(4-methoxybenzylidene)androstan-17-one was found to have a coronary dilator activity 175% that of papaverine when measured on the rabbit heart at a dose level of 0.1–0.5 mg./heart.

By replacing the 3β-dimethylaminoandrosten-17-one in the foregoing preparation by a molar equivalent amount of 3-diethylaminoetiocholan-17-one, 3-(1-pyrrolidyl)etiocholan - 17-one, 3β-dimethylaminoetiocholan - 17-one, 3-(1-piperidyl)etiocholan - 17-one, 3-(4-morpholinyl)etiocholan - 17-one, 3-dibutylaminoetiocholan - 17-one, 3-dicyclohexylaminoetiocholan - 17-one, 3-[N-(cyclopentyl)methylamino]etiocholan - 17-one, 3-hexamethyleniminoetiocholan - 17-one, 3-(1-piperazinyl)etiocholan-17-one, 3-(4-methyl - 1-piperazinyl)etiocholan - 17-one, 3-dibenzylaminoetiocholan - 17-one, 3-[N-(benzyl)methylamino]etiocholan - 17 - one, or 3α - dimethylaminoetiocholan - 17-one, there can be obtained, respectively, 3-diethylamino - 16-(4-methoxybenzylidene)-etiocholan-17-one [V; B=N is (C$_2$H$_5$)$_2$N, R is CHC$_6$H$_4$OCH$_3$-4, Y is CH$_3$, X is H$_2$, Z' is C=O], 3-(1-pyrrolidyl)-16-(4-methoxybenzylidene)etiocholan - 17-one [V; B=N is 1-pyrrolidyl, R is CHC$_6$H$_4$OCH$_3$-4, Y is CH$_3$, X is H$_2$, Z' is C=O], 3β-dimethylamino - 16-(4-methoxybenzylidene)etiocholan - 17-one [V; B=N is β-(CH$_3$)$_2$N, R is CHC$_6$H$_4$OCH$_3$-4, Y is CH$_3$, X is H$_2$, Z' is C=O], 3-(1-piperidyl) - 16-(4-methoxybenzylidene)etiocholan-17-one [V; B=N is 1-piperidyl, R is CHC$_6$H$_4$OCH$_3$-4, Y is CH$_3$, X is H$_2$, Z is C=O], 3-(4-morpholinyl)-16-(4-methoxybenzylidene)etiocholan - 17-one [V; B=N is 4-morpholinyl, R is CHC$_6$H$_4$OCH$_3$-4, Y is CH$_3$, X is H$_2$, Z' is C=O], 3-dibutylamino-16-(4-methoxybenzylidene)etiocholan - 17-one [V; B=N is (C$_4$H$_9$)$_2$N, R is CHC$_6$H$_4$OCH$_3$-4, Y is CH$_3$, X is H$_2$, Z' is C=O], 3-dicyclohexylamino - 16 - (4-methoxybenzylidene)etiocholan - 17-one [V; B=N is (C$_6$H$_{11}$)$_2$N, R is

Y is CH$_3$, X is H$_2$, Z' is C=O], 3-[N-(cyclopentyl)methylamino]-16-(4-methoxybenzylidene)etiocholan - 17-one [V; B=N is C$_5$H$_9$)(CH$_3$)N, R is CHC$_6$H$_4$OCH$_3$-4, Y is CH$_3$, X is H$_2$, Z' is C=O], 3-hexamethylenimino-16-(4-methoxybenzylidene)etiocholan - 17 - one [V; B=N is (CH$_2$)$_6$N, R is CHC$_6$H$_4$OCH$_3$, Y is CH$_3$, X is H$_2$, Z' is C=O], 3 - (1 - piperazinyl)-16-(4-methoxybenzylidene) etiocholan - 17 - one [V; B=N is HN(CH$_2$)$_4$N, R is CHC$_6$H$_4$OCH$_3$-4, Y is CH$_3$, X is H$_2$, Z' is C=O], 3-(4-methyl - 1 - piperazinyl)-16-(4-methoxybenzylidene)etiocholan - 17 - one [V; B=N is CH$_3$N(CH$_2$)$_4$N, R is CHC$_6$H$_4$OCH$_3$-4, Y is CH$_3$, X is H$_2$, Z' is C=O], 3-dibenzylamino - 16 - (4-methoxybenzylidene)etiocholan-17-one [V; B=N is (C$_6$H$_5$CH$_2$)$_2$N, R is CHC$_6$H$_4$OCH$_3$-4, Y is CH$_3$, X is H$_2$, Z' is C=O], 3-[N-(benzyl)methylamino]-16-(4-methoxybenzylidene)etiocholan-17-one [V; B=N is (C$_6$H$_5$CH$_2$)(CH$_3$)N, R is CHC$_6$H$_4$OCH$_3$-4, Y is CH$_3$, X is H$_2$, Z' is C=O], or 3α-dimethylamino-16-(4-methoxybenzylidene)etiocholan - 17 - one [V; B=N is α-(CH$_3$)$_2$N, R is CHC$_6$H$_4$OCH$_3$-4, Y is CH$_3$, X is H$_2$, Z' is C=O].

By replacing the anisaldehyde in the foregoing preparation by a molar equivalent amount of 2-pyridinecarboxaldehyde, 3-pyridinecarboxaldehyde, 2-furancarboxaldehyde, 3-furancarboxaldehyde, 2-thiophencarboxaldehyde, 3-thiophencarboxaldehyde, 4-nitrobenzaldehyde, p-toluialdehyde, 3,5-dinitrobenzaldehyde, 2-butoxy-4-nitrobenzaldehyde, p-methylthiobenzaldehyde, or 3,4-methylenedioxybenzaldehyde, there can be obtained, respectively, 3β-dimethylamino - 16(2-pyridylmethylene)androstan-17-one [V; B=N is β-(CH$_3$)$_2$N, R is 2-pyridylmethylene, Y is CH$_3$, X is H$_2$, Z' is C=O], 3β-dimethylamino - 16-(3-pyridylmethylene)androstan - 17-one [V; B=N is β-(CH$_3$)$_2$N, R is 3-pyridylmethylene, Y is CH$_3$, X is H$_2$, Z' is C=O], 3β-dimethylamino - 16(2-furylmethylene)androstan - 17-one [V; B=N is β-(CH$_3$)$_2$N, R is 2-furylmethylene, Y is CH$_3$, X is H$_2$, Z' is C=O], 3β-dimethylamino - 16 - (3-furylmethylene)androstan - 17-one [V; B=N is β-(CH$_3$)$_2$N, R is 3-furylmethylene, Y is CH$_3$, X is H$_2$, Z' is C=O], 3β-dimethylamino - 16-(2-thienylmethylene)-androstan - 17-one [V; B=N is β-(CH$_3$)$_2$N, R is 2-thienylmethylene, Y is CH$_3$, X is H$_2$, Z' is C=O], 3β-dimethylamino - 16 - (3-thienylmethylene)androstan-17-one [V; B=N is β-(CH$_3$)$_2$, R is 3-thienylmethylene, Y is CH$_3$, X is H$_2$, Z' is C=O], 3β-dimethylamino-16-(4-nitrobenzylidene)androstan - 17 - one [V; B=N is β-(CH$_3$)$_2$N, R is CHC$_6$H$_4$NO$_2$-4, Y is CH$_3$, X is H$_2$, Z' is C=O], 3β-dimethylamino - 16-(4-methylbenzylidene)androstan - 17-one [V; B=N is β-(CH$_3$)$_2$N, R is CHC$_6$H$_4$CH$_3$-4, Y is CH$_3$, X is H$_2$, Z' is C=O], 3β-dimethylamino - 16(3,5-dinitrobenzylidene)androstan - 17-one [V; B=N is β-(CH$_3$)$_2$N, R is CHC$_6$H$_3$(NO$_2$)$_2$-3,5, Y is CH$_3$, X is H$_2$, Z' is C=O], 3β-dimethylamino-16-(2-butoxy-4-nitrobenzylidene)androstan - 17-one [V; B=N is β-(CH$_3$)$_2$N, R is CHC$_6$H$_3$(OC$_4$H$_9$) (NO$_2$)—2,4, Y is CH$_3$, X is H$_2$, Z' is C=O], 3β-dimethylamino - 16-(4-methylthiobenzylidene)androstan - 17-one [V; B=N is β-(CH$_3$)$_2$N, R is CHC$_6$H$_4$SCH$_3$-4, Y is CH$_3$, X is H$_2$, Z' is C=O], or 3β-dimethylamino - 16-(3-,4-methylenedioxybenzylidene)androstan - 17 - one [V; B=N is β-(CH$_3$)$_2$N, R is CHC$_6$H$_3$(O$_2$CH$_2$)-3,4, Y is CH$_3$, X is H$_2$, Z' is C=O].

(b) 3β-dimethylamino - 16 - (4-methoxybenzylidene)-androstan-17-one methobromide.—A solution of 1.6 g. of 3β - dimethylamino - 16 - (4-methoxybenzylidene)androstan-17-one in 30 ml. of acetonitrile was placed in a glass pressure vessel chilled in ice. Methyl bromide gas was passed through the solution until the volume of liquid had increased by about 5 ml. The glass vessel was closed and heated at 100° C. for one hour, then brought to room temperature and opened. The solution was filtered and concentrated, and hot n-hexane was added to the residue. The crystalline product was collected and recrystallized from isopropyl alcohol to give 3β-dimethylamino - 16 - (4-methoxybenzylidene)androstan-17-one methobromide, M.P. 305° C. (dec.) (uncorr.), [α]$_D^{25}$=−8.9° (1% in chloroform).

EXAMPLE 74

3β-dimethylamino - 16 - (2,4-dichlorobenzylidene)androstan - 17 - one [V; B=N is B-(CH$_3$)$_2$N, R is CHC$_6$H$_3$Cl$_2$-2,4, Y is CH$_3$, X is H$_2$, Z' is C=O] was prepared from 7.2 g. of 3β-dimethylaminoandrostan-17-one and 6.1 g. of 2,4-dichlorobenzaldehyde according to the procedure described above in Example 73. The product was recrystallized twice from acetonitrile to give 3β-dimethylamino-16-(2,4-dichlorobenzylidene)androstan - 17-one in the form of pale yellow crystals, M.P. 164,0–165.0° C. (corr.), [α]$_D^{25}$=+36.9° (1% in chloroform); ultraviolet maxima at 233 and 294 mμ (E=11,000 and 22,500).

3β - dimethylamino - 16 - (2,4-dichlorobenzylidene)-androstan-17-one was found to have coronary dilator activity 230% that of papaverine when measured on the rabbit heart at a dose level of 0.05 mg./heart.

The methobromide salt of 3β-dimethylamino-16-(2,4-dichlorobenzylidene)androstan-17-one was obtained in the form of pale yellow crystals, M.P. 282.2–283.0° C. (dec.) (corr.) when recrystallized from acetonitrile, $[\alpha]_D^{25}=+12.6°$ (1% in chloroform).

3β-dimethylamino-16-(2,4-dichlorobenzylidene)androstan-17-one methobromide was found to have coronary dilator activity 204% that of papaverine when measured on the rabbit heart at a dose level of 0.05 mg/heart; and it showed bacteriostatic activity in vitro against *Staph. aureus* and *Cl. welchii* at log dilution values at 6.0 and 5.6, respectively.

EXAMPLE 75

3β - dimethylamino - 16 - (4-dimethylaminobenzylidene)androstan-17-one [V; B=N is β-$(CH_3)_2$N, R is $CHC_6H_4N(CH_3)_2$-4, Y is $CH_3$, X is $H_2$, Z' is C=O] was prepared from 6.36 g. of 3β-dimethylaminoandrostan-17-one and 5.6 g. of 4-dimethylaminobenzaldehyde by the procedure described above in Example 73. The product was chromatographed on silica and eluted with 1% methanol in ether to give 3β-dimethylamino-16-(4-dimethylaminobenzylidene)androstan-17-one in the form of yellow needles, M.P. 238.0–238.8° C. (corr.), $[\alpha]_D^{25}=+30.5°$ (1% in chloroform); ultraviolet maxima at 252 and 318 mμ (E=8,900 and 33,700).

The methobromide salt of 3β-dimethylamino-16-(4-dimethylaminobenzylidene)androstan - 17 - one was obtained in the form of yellow needles, M.P. 290.2–291.4° C. (dec.) (corr.), $[\alpha]_D^{25}=-22.7°$ (0.5% in chloroform).

EXAMPLE 76

3β - dimethylamino - 16 - (4-pyridylmethylene)androstan-17-one [V; B=N is β-$(CH_3)_2$N, R is 4-pyridylmethylene, Y is $CH_3$, X is $H_2$, Z' is C=O] was prepared from 3.18 g. of 3β-dimethylaminoandrostan-17-one and 2.14 g. of 4-pyridinecarboxaldehyde according to the procedure described above in Example 73. The product was recrystallized from ethyl acetate to give 3β-dimethylamino-16-(4-pyridylmethylene)androstan-17-one in the form of pale yellow needles, M.P. 195.0–202.8° C. (corr.), $[\alpha]_D^{25}=+6.8°$ (1% in chloroform).

EXAMPLE 77

3α - dimethylamino - 16 - (4-methoxybenzylidene)etiocholan - 17 - one [V; B=N is α-$(CH_3)_2$N, R is $CHC_6H_4OCH_3$-4, Y is $CH_3$, X is $H_2$, Z' is C=O] was prepared from 6.36 g. of 3α-dimethylaminoetiocholan-17-one (Example 12) and 4.08 g. of anisaldehyde according to the procedure described above in Example 73. The product was recrystallized from acetonitrile to give 6.6 g. of 3α-dimethylamino-16-(4-methoxybenzylidene)etiocholan-17-one in the form of pale yellow rods, M.P. 160.4–164.8° C. (corr.), $[\alpha]_D^{25}=+5.7°$ (1% in chloroform).

EXAMPLE 78

3α - dimethylamino - 16 - (3,4,5-trimethoxybenzylidene)etiocholan-17-one [V; B=N is α-$(CH_3)_2$N, R is $CHC_6H_2(OCH_3)_3$-3,4,5, Y is $CH_3$, X is $H_2$, Z' is C=O] was prepared from 6.36 g. of 3α-dimethylaminoetiocholan-17-one (Example 12) and 5.88 g. of 3,4,5-trimethoxybenzaldehyde according to the procedure described above in Example 73. The product was chromatographed on alumina and obtained as a yellow amorphous solid, M.P. 90.4–95.2° C. (corr.); ultraviolet maxima at 241 and 321 mμ (E=11,200 and 21,100); infrared absorption at 2.95, 3.44, 3.64, 5.82, 6.16, 6.33, 6.64 and 6.88μ.

EXAMPLE 79

3α - dimethylamino - 16 - isopropylideneetiocholan-17-one [V; B=N is α-$(CH_3)_2$N, R is $C(CH_3)_2$, Y is $CH_3$, X is $H_2$, Z' is C=O] was prepared from 3α-dimethylaminoetiocholan-17-one, acetone and potassium hydroxide in methanol solution according to the procedure of Example 73. The reaction time was two and one-half days. The product was obtained in the form of colorless plates, M.P. 121.8–122.6° C. (corr.) when recrystallized from acetonitrile; $[\alpha]_D^{25}=-1.7°$ (1% in chloroform).

EXAMPLE 80

3α - dimethylamino - 16 - (4-methoxybenzylidene)etiocholan-17β-ol [V; B=N is α-$(CH_3)_2$N, R is $CHC_6H_4OCH_3$-4 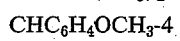

Y is $CH_3$, X is $H_2$, Z' is CH(OH-β)] was prepared by reduction of 7.7 g. of 3α-dimethylamino-16-(4-OCH_3-4, Y is $CH_3$, X is $H_2$, Z' is CH(OH-β)] was prepared by reduction of 7.7 g. of 3α-dimethylamino-16-(4-methoxybenzylidene)etiocholan-17-one (Example 77) with 7.6 g. of sodium borohydride in 220 ml. of ethanol, five hours at room temperature. The product was recrystallized first from ethyl acetate and then from methanol to give 3α-dimethylamino-16-(4-methoxybenzylidene)etiocholan-17β-ol in the form of colorless needles, M.P. 222.0–224.8° C. (corr.), $[\alpha]_D^{25}=-124.8°$ (1% in chloroform).

EXAMPLE 81

3α - dimethylamino - 16 - (4-methoxybenzylidene)etiocholan-17β-ol-N-oxide [V; B=N is α-$(CH_3)_2$NO, R is $CHC_6H_4OCH_3$-4, Y is $CH_3$, X is $H_2$, Z' is CH(OH-β)] was prepared by oxidation of 3α-dimethylamino-16-(4-methoxybenzylidene)etiocholan - 17β - ol (Example 80) with hydrogen peroxide according to the procedure of Example 13, and was obtained as a colorless solid, M.P. 175.8–178.8° C. (corr.) when recrystallized from ethyl acetate containing a trace of methanol; $[\alpha]_D^{25}=-112.0°$ (1% in chloroform).

3α-(1-piperidyl)etiocholane-11,17-dione (prepared by chromic oxide oxidation of 3α-(1-piperidyl)etiocholan-17β-ol-11-one) can be caused to react with benzaldehyde according to the procedure of Example 73 to give 3α-(1-piperidyl)-16-benzylidene etiocholane-11,17-dione [V; B=N is α-(1-piperidyl), R is $CHC_6H_5$, Y is O, Z' is C=O].

3α - dimethylamino-19-noretiocholan-17-one (prepared by chromic acid oxidation of 3α-dimethylamino-19-noretiocholan-17β-ol, in turn prepared by reductive amination of 19-noretiocholan-17β-ol-3-one) can be caused to react with benzaldehyde according to the procedure of Example 73 to give 3α-dimethylamino-16-benzylidene-19-noretiocholan-17-one [V; B=N is α-$(CH_3)_2$N, R is $CHC_6H_5$, Y is H, X is $H_2$, Z' is C=O].

3β - dimethylamino - 16 - (4 - methoxybenzylidene) androstan-17-one (Example 73) can be caused to react with methylmagnesium bromide to give 3β-dimethylamino - 17α - methyl - 16 - (4 - methoxybenzylidene) androstan-17β-ol [V; B=N is β-$(CH_3)_2$N, R is $CHC_6H_4OCH_3$=4 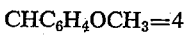

Y is $CH_3$, X is $H_2$, Z' is C($CH_3$)(OH—β)].

We claim:

1. A compound selected from the group consisting of (A) compounds of the formula

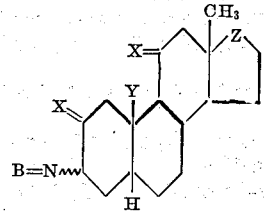

wherein B=N is a member of the group consisting of lower - alkylamino, cycloalkylamino, lower - alkanoylamino, carbamylamino, N,N - di - lower - alkylcarbamylamino, N-(lower-alkanoyl)-lower-alkylamino, N-carbamyl) - lower - alkylamino, 2 - lower - alkanoyl - 1 - hydrazino, morpholino - lower - alkylamino, piperidino - lower-alkylamino, pyrrolidino-lower-alkylamino, pyridyl-lower-alkylamino, di-lower-alkylamino-lower-alkylamino, tertiaryamino and tertiary-amino N-oxide, tertiary-amino in each instance being basic and having a molecular weight less than 200; X is a member of the group consisting of $H_2$, (H)(OH), (H)(OAcyl) and O; Y is a member of the group consisting of H and $CH_3$; and Z is a member of the group consisting of $$CH_2, \quad \overset{O}{\underset{C}{\parallel}} \text{(lower alkyl)}, \quad \overset{OH}{\underset{O}{\diagup}} \text{(cycloalkyl)}, \quad \overset{OH}{\underset{C}{\diagup}}$$

$$\text{(lower alkyl)} \overset{OAcyl}{\underset{O}{\diagup}} \overset{C}{\underset{C}{\parallel\parallel}} \overset{OH}{\underset{C}{\diagup}} \overset{CH_2-(\text{tertiary-amino})}{\underset{C}{\diagup}} \overset{OH}{\underset{C}{\diagup}}$$

$$\overset{CH_2-(\text{tertiary-amino})}{\underset{CH_2}{\mid}} \overset{CH_2-(\text{tertiary-amino})}{\underset{CH}{\parallel}} \overset{CH_2OH}{\underset{C}{\parallel\parallel}}$$
$$\overset{CH_2}{\underset{C}{\diagup}} \overset{OH}{\diagup}, \overset{CH}{\underset{C}{\diagup}} \overset{OH}{\diagup}, \text{and} \overset{C}{\underset{C}{\diagup}} \overset{OH}{\diagup}$$

tertiary-amino in each instance being basic and having a molecular weight less than 200, and Acyl in each instance having from one to ten carbon atoms and a molecular weight less than 200; (B) compounds of the above formula having a double bond in one of the 7,8-, 8,9-, 8,14-, 9,11-, 11,12-, 14,15- and 15,16-positions; (C) compounds of the above formula having a methyl group in one of the 1-, 2-, 4-, 5-, 6-, 7- and 16-positions; (D) compounds of the above formula having a hydroxy group in one of the 6-, 7- and 12-positions; (E) acid-addition salts thereof; and (F) quaternary ammonium salts thereof, where B=N is tertiary-amino; tertiary-amino in each instance being a member of the group consisting of di-lower-alkylamino, dicycloalkylamino in which the cycloalkyl has from 5 to 6 ring members, N-(cycloalkyl)-lower-alkylamino in which the cycloalkyl has from 5 to 6 ring members, polymethylenimino having from 5 to 7 ring members and lower-alkylated derivatives thereof, 3-hydroxy-1-piperidyl, 4-hydroxy-1-piperidyl, 4-morpholinyl, 1-piperazinyl, 4-hydrocarbon substituted-1-piperazinyl in which the hydrocarbon substituent has from 1 to 10 carbon atoms, 4-carbo-lower-alkoxy-1-piperazinyl, 4-hydroxyethyl-1-piperazinyl, 1-homopiperazinyl and lower-alkylated derivatives thereof, di-(phenyl-lower-alkyl)amino, N-(phenyl-lower-alkyl)-lower-alkylamino, and N-lower-alkyl-N-(di-lower-alkylamino-lower-alkyl)amino.

2. 3-(di-lower-alkylamino)-17α-lower - alkyletiocholan-17β-ol.
3. 3α-isopropylidenaminoetiocholan-17β-ol.
4. 3α-dimethylamino-17α-methyletiocholan-17β-ol.
5. 17β - acetoxy - 3α - dimethylamino - 17α - methyletiocholane.
6. 3α-dimethylamino-17α-methyletiocholan-17β-ol N-oxide.
7. 3 - (di-lower-alkylamino)-17α-ethynyletiocholan-17β-ol.
8. 3-(di-lower-alkylamino)etiocholan-17-one.
9. 3α-dimethylaminoetiocholan-17-one.
10. 3α-dimethylaminoetiocholan-17-one N-oxide.
11. 17α - methyl-3β-(4-methyl-1-piperazinyl)etiocholan-17β-ol.
12. 17α - methyl-3α-(4-hydroxy-1-piperidyl)etiocholan-17β-ol.
13. 3-[N-(di-lower-alkylamino-lower-alkyl)-N-methylamino]etiocholan-17β-ol.
14. 16-halo-3α-dimethylaminoetiocholan-17-one.
15. 17α-methyl - 3 - (3-hydroxy-1-piperidyl)etiocholan-17β-ol.
16. 3α-dimethylamino-4β-methyletiocholan-17β-ol.
17. 17β-acetoxy-3-(2-formyl-1-hydrazino)etiocholane.

18. 3α - dimethylamino - 17α - methyl-9(11)-etiocholen-17β-ol.
19. 3α-(4-hydroxy-1-piperidyl)-17α-methyletiocholane-11α,17α-diol.
20. 3α - (4 - hydroxy - 1 - piperidyl)-17α-methyl-9(11)-etiocholen-17β-ol.
21. 3α - dimethylamino - 17α - methyl-9(11)-etiocholen-17β-ol N-oxide.
22. A compound selected from the group consisting of 4β-methyletiocholan-17β-ol-3-one oxime and its 17-acetate.
23. 3β-amino-4β-methyletiocholan-17β-ol.
24. 17α-methyl-9(11)-etiocholen-17β-ol-3-one.
25. 3α-dimethylaminoetiocholan-17β-ol nitrate.
26. 17α - cyclopropyl - 3α - dimethylaminoetiocholan-17β-ol.
27. A compound selected from the group consisting of (A) compounds of the formula

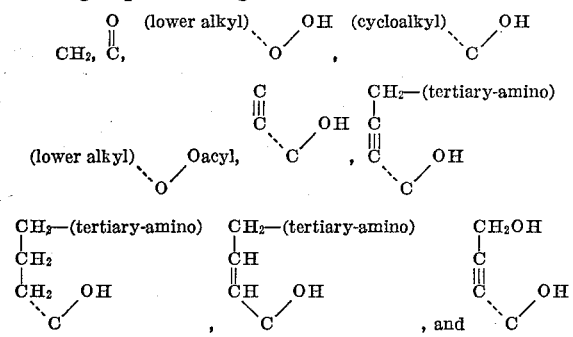

wherein B=N is a member of the group consisting of tertiary-amino and tertiary-amino N-oxide, tertiary-amino in each instance being basic and having a molecular weight less than 200; R is a member of the group consisting of lower-alkylidene and monocyclic arylmethylene; X is a member of the group consisting of $H_2$, (H)(OH), (H)(OAcyl) and O; Y is a member of the group consisting of H and $CH_3$; and Z' is a member of the group consisting of C=O, $$\overset{H}{\underset{C}{\diagup}} \overset{OH}{\diagup}, \overset{H}{\underset{C}{\diagup}} \overset{OAcyl}{\diagup} \text{ and } \overset{(\text{lower-alkyl})}{\underset{C}{\diagup}} \overset{OH}{\diagup}$$

Acyl in each instance having from one to ten carbon atoms and a molecular weight less than 200; (B) acid-addition salts thereof; and (C) quaternary ammonium salts thereof; tertiary-amino in each instance being a member of the group consisting of di-lower-alkylamino, dicycloalkylamino in which the cycloalkyl has from 5 to 6 ring members, N-(cycloalkyl)-lower-alkylamino in which the cycloalkyl has from 5 to 6 ring members, polymethylenimino having from 5 to 7 ring members and lower-alkylated derivatives thereof, 3-hydroxy-1-piperidyl, 4-hydroxy-1-piperidyl, 4-morpholinyl, 1-piperazinyl, 4-hydrocarbon substituted-1-piperazinyl in which the hydrocarbon substituent has from 1 to 10 carbon atoms, 4-carbo-lower-alkoxy-1-piperazinyl, 4-hydroxyethyl-1-piperazinyl, 1-homopiperazinyl and lower-alkylated derivatives thereof, di-(phenyl-lower-alkyl)amino, N-(phenyl-lower-alkyl)-lower-alkylamino, and N-lower-alkyl-N-(di-lower-alkylamino-lower-alkyl)amino.

28. A 3-(di-lower-alkylamino)-16-(monocyclic arylmethylene)androstan-17-one.
29. A 3 - (di-lower-alkylamino)-16-(monocyclic arylmethylene)etiocholan-17-one.
30. 3β-dimethylamino - 16 - (4-methoxybenzylidene)androstan-17-one.
31. 3β-dimethylamino-16-(2,4-dichlorobenzylidene)androstan-17-one.
32. 3β-dimethylamino - 16 - (4 - dimethylaminobenzylidene)androstan-17-one.
33. 3β - dimethylamino-16-(4-pyridylmethylene)androstan-17-one.
34. 3α-dimethylamino-16-(4-methoxybenzylidene)etiocholan-17-one.
35. 3α-dimethylamino-16-(3,4,5-trimethoxybenzylidene)etiocholan-17-one.
36. 3-tertiary-aminoandrostan-17-one, wherein tertiary-amino is basic and has a molecular weight less than 200, and is a member of the group consisting of di-lower-alkylamino, dicycloalkylamino in which the cycloalkyl has from 5 to 6 ring members, N-(cycloalkyl)-lower-alkylamino in which the cycloalkyl has from 5 to 6 ring members, polymethylenimino having from 5 to 7 ring members and lower-alkylated derivatives thereof, 3-hydroxy-1-piperidyl, 4-hydroxy-1-piperidyl, 4-morpholinyl, 1-piperazinyl, 4-hydrocarbon substituted-1-piperazinyl in which the hydrocarbon substituent has from 1 to 10 carbon atoms, 4 - carbo - lower-alkoxy-1-piperazinyl, 4-hydroxyethyl-1-piperazinyl, 1-homopiperazinyl and lower-alkylated derivatives thereof, di(phenyl-lower-alkyl)amino, N-(phenyl - lower - alkyl) - lower-alkylamino, and N-lower-alkyl-N-(di-lower-alkylamino-lower-alkyl)amino.

37. 3-(di-lower-alkylamino)androstan-17-one.
38. 3β-dimethylaminoandrostan-17-one.
39. 3β-dimethylamino-17α-ethynylandrostan-17β-ol.
40. A compound of the formula

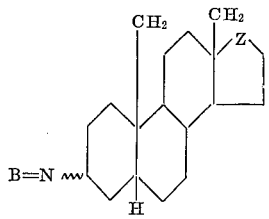

wherein B=N is a member of the group consisting of carbamylamino, N,N-di-lower-alkylcarbamylamino, N-(carbamyl)-lower-alkylamino, morpholino-lower-alkylamino, pyridyl-lower-alkylamino, 4-hydroxy-1-piperidyl, 4-acetoxy-1-piperidyl, 4-hydroxyethyl-1-piperazinyl and di-lower-alkylamino N-oxide; and Z is a member of the group consisting of

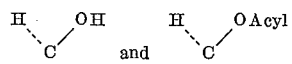

Acyl having from one to ten carbon atoms and a molecular weight less than 200.

41. 17β-nicotinoyloxy-3α-dimethylaminoetiocholane.

References Cited
UNITED STATES PATENTS

| | | | |
|---|---|---|---|
| 3,424,747 | 1/1969 | Schmitt et al. | 260—239.5 |
| 2,705,238 | 3/1955 | Julian et al. | 260—397.3 |
| 2,773,072 | 12/1956 | Herr et al. | 260—397.3 |
| 2,933,511 | 4/1960 | Laos et al. | 260—397.3 |
| 3,004,968 | 10/1961 | Jeger et al. | 260—239.55 |
| 3,016,390 | 1/1962 | Counsell | 260—397.5 |
| 3,052,672 | 9/1962 | Nomine et al. | 260—239.5 |

OTHER REFERENCES

Janot et al.—Soc., Chim. France, pp. 1640–43 (1960).

HENRY A. FRENCH, Primary Examiner

U.S. Cl. X.R.

260—239.55, 397, 397.3, 397.4, 397.45, 397.5, 999

PO-1050
(5/69)

UNITED STATES PATENT OFFICE
CERTIFICATE OF CORRECTION

Patent No. 3,503,959            Dated March 31, 1970

Inventor(s) Robert G. Christiansen and John W. Dean

It is certified that error appears in the above-identified patent and that said Letters Patent are hereby corrected as shown below:

Column 1, lines 36-37, delete "lower-alkanoylamino, carbamylamino, N,N-di-lower-alkylamino," and insert --lower-alkanoyl-1-hydrazino, morpholino-lower-alkylamino,--.

Column 3, formula at lines 60-68 should read

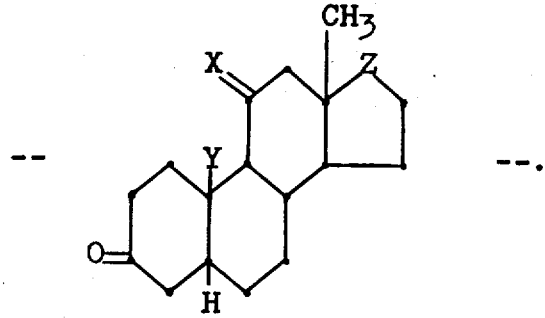

Column 5, line 29, "S=O" should read --C=O--.

Column 14, line 36, "(15.25% g.)" should read --(15.25 g.)-- line 46, "100°" should read --100%--.

Column 15, line 11, "627" should read --62%--; line 21, after "3β-dimethylaminoandrostan-17-one" insert --methobromide--.

Column 16, line 60, "hour hours" should read --four hours--.

Column 18, line 3, "α-CH$_2$NH" should read --α-CH$_3$NH--.

Column 24, line 43, "amino)etiocholan-17β-ol" should read --aminoethylamino)etiocholan-17β-ol--.

Column 25, line 25 and column 27, lines 15, 27 and 32, "-3ε-" should read -- -3ξ - --, each occurrence.

Column 27, line 63, "158.0-158.0°C." should read --158.0-159.0°C.--.

(contd.)

UNITED STATES PATENT OFFICE
CERTIFICATE OF CORRECTION

Patent No. 3,503,959      Dated March 31, 1970

Inventor(s) Robert G. Christiansen and John W. Dean

PAGE - 2

It is certified that error appears in the above-identified patent and that said Letters Patent are hereby corrected as shown below:

Column 29, line 65, "etiocholan-" should read --etiocholen- --.

Column 32, line 27, "$\beta$-$(CH_3)_2$" should read --$\beta$-$(CH_3)_2N$--.

Column 34, line 43, "Y is O," should read --Y is $CH_3$, X is O,--.

Column 34, Claim 1, formula at lines 64-71 should read

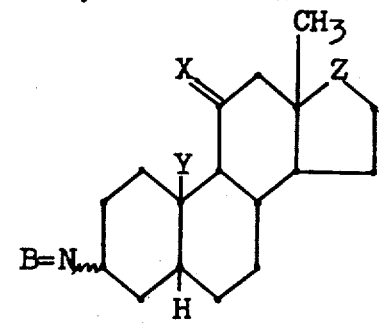

--.

Column 35, line 3, Claim 1, "morphalino-" should read --morpholino- --.

Column 35, lines 11-14, Claim 1, "(lower-alkyl)\O/OH" should read --(lower-alkyl)\C/OH--.

(contd.)

UNITED STATES PATENT OFFICE
CERTIFICATE OF CORRECTION

Patent No. 3,503,959          Dated March 31, 1970

Inventor(s) Robert G. Christiansen and John W. Dean

It is certified that error appears in the above-identified patent and that said Letters Patent are hereby corrected as shown below:

PAGE - 3

Column 35, lines 15-19, Claim 1,

"(lower-alkyl)\O/Oacyl" should read -- (lower-alkyl)\C/OAcyl --;

and " C≡C\C/OH " should read -- CH≡C\C/OH --.

Column 35, lines 20-25, Claim 1,

" CH$_2$-(tertiary-amino) / CH≡CH\C/OH " should read -- CH$_2$-(tertiary-amino) / CH≡CH\C/OH --.

Column 37, Claim 40, formula at lines 19-29 should read

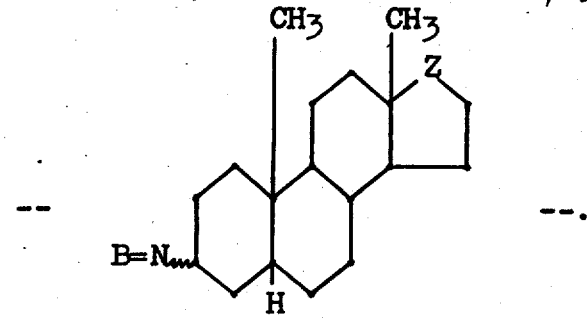

Signed and sealed this 6th day of July 1971.

(SEAL)
Attest:

EDWARD M.FLETCHER,JR.
Attesting Officer

WILLIAM E. SCHUYLER, JR.
Commissioner of Patents